(12) United States Patent
Yoshikawa et al.

(10) Patent No.: US 11,781,618 B2
(45) Date of Patent: Oct. 10, 2023

(54) DAMPER DEVICE

(71) Applicants: AISIN AW INDUSTRIES CO., LTD, Echizen (JP); AISIN CORPORATION, Kariya (JP)

(72) Inventors: Takuya Yoshikawa, Echizen (JP); Aki Ogawa, Echizen (JP); Ryosuke Otsuka, Echizen (JP); Akiyoshi Kato, Echizen (JP); Yoichi Oi, Anjo (JP); Masaki Wajima, Anjo (JP)

(73) Assignees: AISIN AW INDUSTRIES CO., LTD, Echizen (JP); AISIN CORPORATION, Kariya (JP)

( * ) Notice: Subject to any disclaimer, the term of this patent is extended or adjusted under 35 U.S.C. 154(b) by 1267 days.

(21) Appl. No.: 16/327,546

(22) PCT Filed: Sep. 13, 2017

(86) PCT No.: PCT/JP2017/033073
§ 371 (c)(1),
(2) Date: Feb. 22, 2019

(87) PCT Pub. No.: WO2018/052029
PCT Pub. Date: Mar. 22, 2018

(65) Prior Publication Data
US 2019/0203800 A1    Jul. 4, 2019

(30) Foreign Application Priority Data
Sep. 16, 2016 (JP) .................................. 2016-181669

(51) Int. Cl.
*F16F 15/134* (2006.01)
*F16F 15/123* (2006.01)
*F16H 45/02* (2006.01)

(52) U.S. Cl.
CPC .. *F16F 15/13484* (2013.01); *F16F 15/12366* (2013.01); *F16H 45/02* (2013.01); *F16H 2045/0268* (2013.01)

(58) Field of Classification Search
CPC ............ F16F 15/1202; F16F 15/12366; F16F 15/13128; F16F 15/13484; F16F 15/22;
(Continued)

(56) References Cited

U.S. PATENT DOCUMENTS 9,732,824 B2 *   8/2017   Takikawa .......... F16F 15/12366
10,533,650 B2 *   1/2020   Nakamura .......... F16F 15/1202
(Continued)

FOREIGN PATENT DOCUMENTS

DE    102010054249 A1      6/2011
DE    102015215888 A1 *    2/2017   .............. F16F 15/14
(Continued)

OTHER PUBLICATIONS

Nov. 14, 2017 International Search Report issued in International Patent Application No. PCT/JP2017/033073.

*Primary Examiner* — Josh Skroupa
(74) *Attorney, Agent, or Firm* — Oliff PLC

(57) ABSTRACT

A damper device includes an input element; an intermediate element; art output element; a first elastic body that transmits a torque between the input element and the intermediate element; and a second elastic body that transmits a torque between the intermediate element and the output element. The damper device also includes a rotary inertia mass damper that includes a first mass body rotating in accordance with relative rotation between the input element and the output element and that is arranged between the input element and the output element to be parallel to a torque transmission path including the first elastic body, the intermediate element and the second elastic body. Finally, the
(Continued)

damper devices includes a second mass body; and an elastic body arranged to couple the second mass body with the output element.

11 Claims, 11 Drawing Sheets

(58) Field of Classification Search
CPC ............. F16H 45/02; F16H 2045/0263; F16H 2045/0268
USPC ........................................................ 464/68.2
See application file for complete search history.

(56) References Cited

U.S. PATENT DOCUMENTS

| | | |
|---|---|---|
| 2011/0240432 A1 | 10/2011 | Takikawa et al. |
| 2015/0354664 A1 | 12/2015 | Takikawa et al. |
| 2017/0261065 A1 | 9/2017 | Yoshikawa et al. |
| 2022/0333672 A1 * | 10/2022 | Güllük .................... F16H 45/02 |

FOREIGN PATENT DOCUMENTS

| | | | | |
|---|---|---|---|---|
| JP | 2011-214607 A | 10/2011 | | |
| JP | 2015-209953 A | 11/2015 | | |
| WO | 2014/119685 A1 | 8/2014 | | |
| WO | WO-2014119686 A1 * | 8/2014 | ........ | F16F 15/12366 |
| WO | 2016/104783 A1 | 6/2016 | | |

* cited by examiner

DAMPER DEVICE

This is a national phase application of PCT/JP2017/033073 filed on Sep. 13, 2017, claiming priority to Japanese Patent application No. 2016-181669 filed on Sep. 16, 2016, the contents of which are incorporated herein by reference.

TECHNICAL FIELD

The present disclosure relates to a damper device including an elastic body arranged to transmit a torque between an input element and an output element and a rotary inertia mass damper.

BACKGROUND

A conventionally known configuration of this damper device includes a first spring arranged to transmit a torque between a drive member (input element) and an intermediate member (intermediate element); a second spring arranged to transmit a torque between the intermediate member and a driven member (output element); and a rotary inertia mass damper provided parallel to a torque transmission path including the intermediate member, the first spring and the second spring and arranged to include a sun gear as a mass body rotating in accordance with relative rotation between the drive member and the driven member (as described in, for example, Patent Literature 1). In this damper device, on the assumption that an input torque transmitted from an engine to the drive member periodically vibrates, the phase of the vibration transmitted from the drive member to the driven member via the torque transmission path shifts by 180 degrees from the phase of the vibration transmitted from the drive member to the driven member via the rotary inertia mass damper. In this damper device, a damping ratio S of the intermediate member that is determined based on moment of inertia of the intermediate member and stiffnesses of the first and the second springs is less than a value 1. In the torque transmission path including the intermediate element, in the state that deflections of the first and second elastic bodies are allowed, a plurality of natural frequencies (resonance frequencies) are set, and resonance of the intermediate element is made to occur when the rotation speed of the input element reaches a rotation speed corresponding to one of the plurality of natural frequencies. As a result, this damper device is capable of setting two antiresonance points where the vibration transmitted from the input element to the output element via the torque transmission path and the vibration transmitted from the input element to the output element via the rotary inertia mass damper are theoretically cancelled out each other. The vibration damping performance of the damper device is improved by making the frequencies of the two antiresonance points equal to (or closer to) the frequency of a vibration (resonance) that is to be attenuated by the damper device.

CITATION LIST

Patent Literature

Patent Literature 1: WO 2016/104783A

SUMMARY

The damper device described in Patent Literature 1 is designed to form a low rotation-side (low frequency-side) antiresonance point when the rotation speed of the engine is in an expected set range of a lockup rotation speed of a lockup clutch (500 rpm to 1500 rpm), with a view to further lowering the vibration level in a rotation speed range around the lockup rotation speed. The amplitude of the vibration transmitted from the rotary inertia mass damper to the output element, however, gradually increases with an increase in rotation speed of the input element. Accordingly, the damper device of Patent Literature 1 is likely to fail to sufficiently cancel the vibration transmitted from the torque transmission path to the output element by the vibration transmitted from the rotary inertia mass damper to the output element in a range of relatively low rotation speed of the input element (engine) including the rotation speed around the lockup rotation speed.

A main object of the present disclosure is accordingly to further improve the vibration damping performance of the damper device.

The present disclosure is directed to a damper device. The damper device is configured to include an input element to which a torque from an engine is transmitted; an intermediate element; an output element; a first elastic body arranged to transmit a torque between the input element and the intermediate element; and a second elastic body arranged to transmit a torque between the intermediate element and the output element. The damper device further includes a rotary inertia mass damper that includes a first mass body rotating in accordance with relative rotation between the input element and the output element and that is arranged between the input element and the output element to be parallel to a torque transmission path including the first elastic body, the intermediate element and the second elastic body; a second mass body; and an elastic body arranged to couple the second mass body with the output element.

In the damper device of this aspect, on the assumption that an input torque transmitted to the input element periodically vibrates, the phase of the vibration transmitted from the input element to the output element via the torque transmission path shifts by 180 degrees from the phase of the vibration transmitted from the input element to the output element via the rotary inertia mass damper. In the torque transmission path including the intermediate element, in the state that deflections of the first elastic body and the second elastic body are allowed, a plurality of natural frequencies (resonance frequencies) are set, and resonance of the intermediate element is made to occur when the rotation speed of the input element reaches a rotation speed corresponding one of the plurality of natural frequencies. Accordingly, the damper device of this aspect is enabled to set two antiresonance points where the vibration transmitted from the torque transmission path to the output element and the vibration transmitted from the rotary inertia mass damper to the output element are theoretically cancelled out each other. Furthermore, the second mass body and the elastic body arranged to couple the second mass body and the output element constitute a dynamic damper. The dynamic damper applies vibration in an opposite phase to the phase of the vibration of the output element, to the output element. When the frequency of the vibration transmitted to the input element (rotation speed of the input element) is low and the inertia torque applied from the rotary inertia mass damper to the output element decreases, the dynamic damper serves to cancel at least part of the vibration transmitted from the torque transmission path to the output element (to complement the inertia torque). When the frequency of the vibration transmitted to the input element (rotation speed of the input element) is high and the inertia torque applied from the rotary inertia mass damper to the output element increases (to become excess), on the other hand, the dynamic damper serves to cancel at least part of the inertia torque (to complement the torque from the torque transmission path). As a result, the damper device of this aspect further reduces the vibration level in a lower rotation speed range than a low rotation-side antiresonance point and in a rotation speed range between two antiresonance points and thereby further improves the vibration damping performance in a range of relatively low rotation speed of the input element.

BRIEF DESCRIPTION OF DRAWINGS

FIG. 5 is a diagram illustrating relationships between rotation speed of an engine and torque fluctuation $T_{Fluc}$ of the output element of the damper device shown in FIG. 1 and the like;

DESCRIPTION OF EMBODIMENTS

Embodiments of the present disclosure are described below with reference to drawings.

Figure 1:
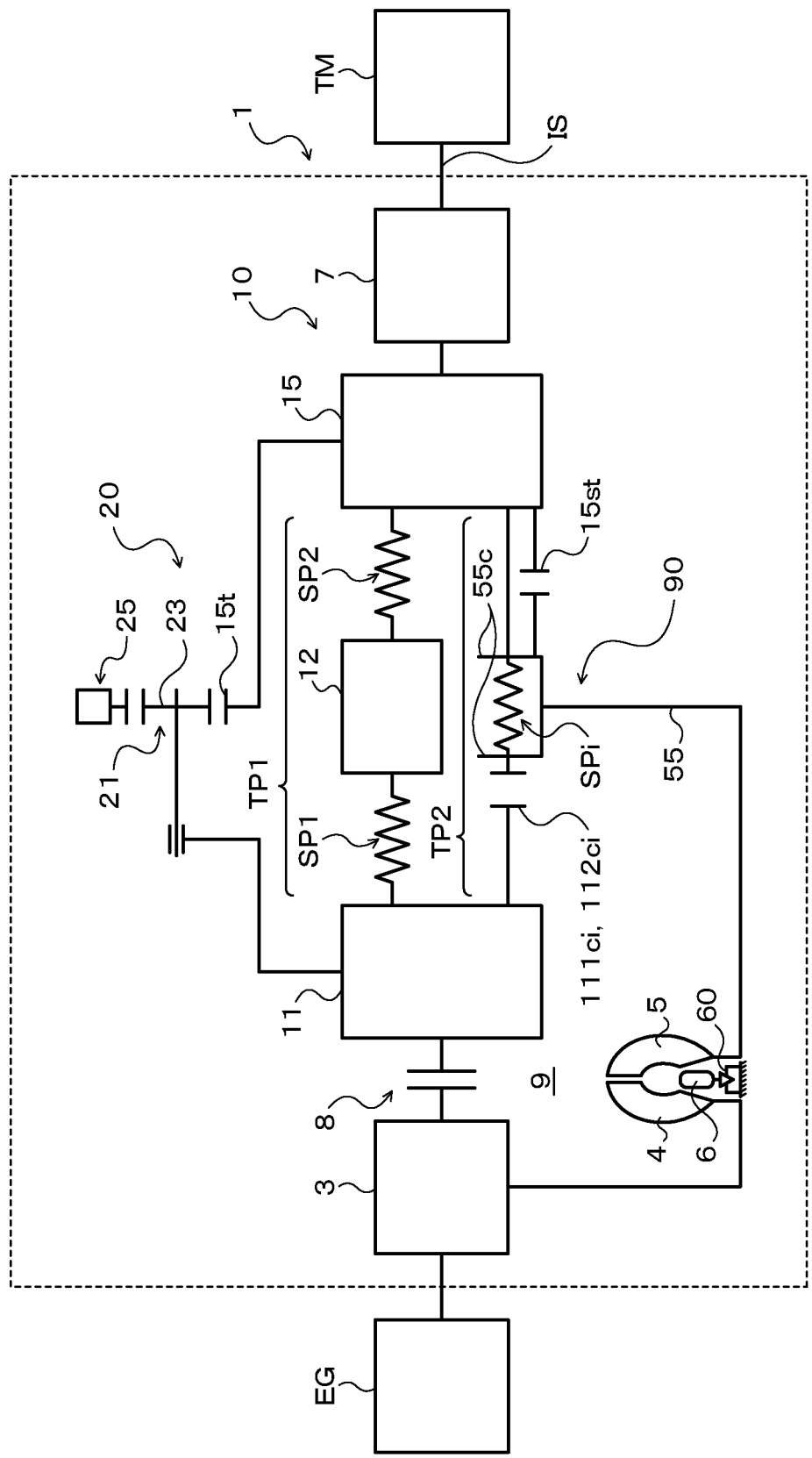
FIG. 1 is a schematic configuration diagram illustrating a starting device including a damper device of the present disclosure.
Figure 2:
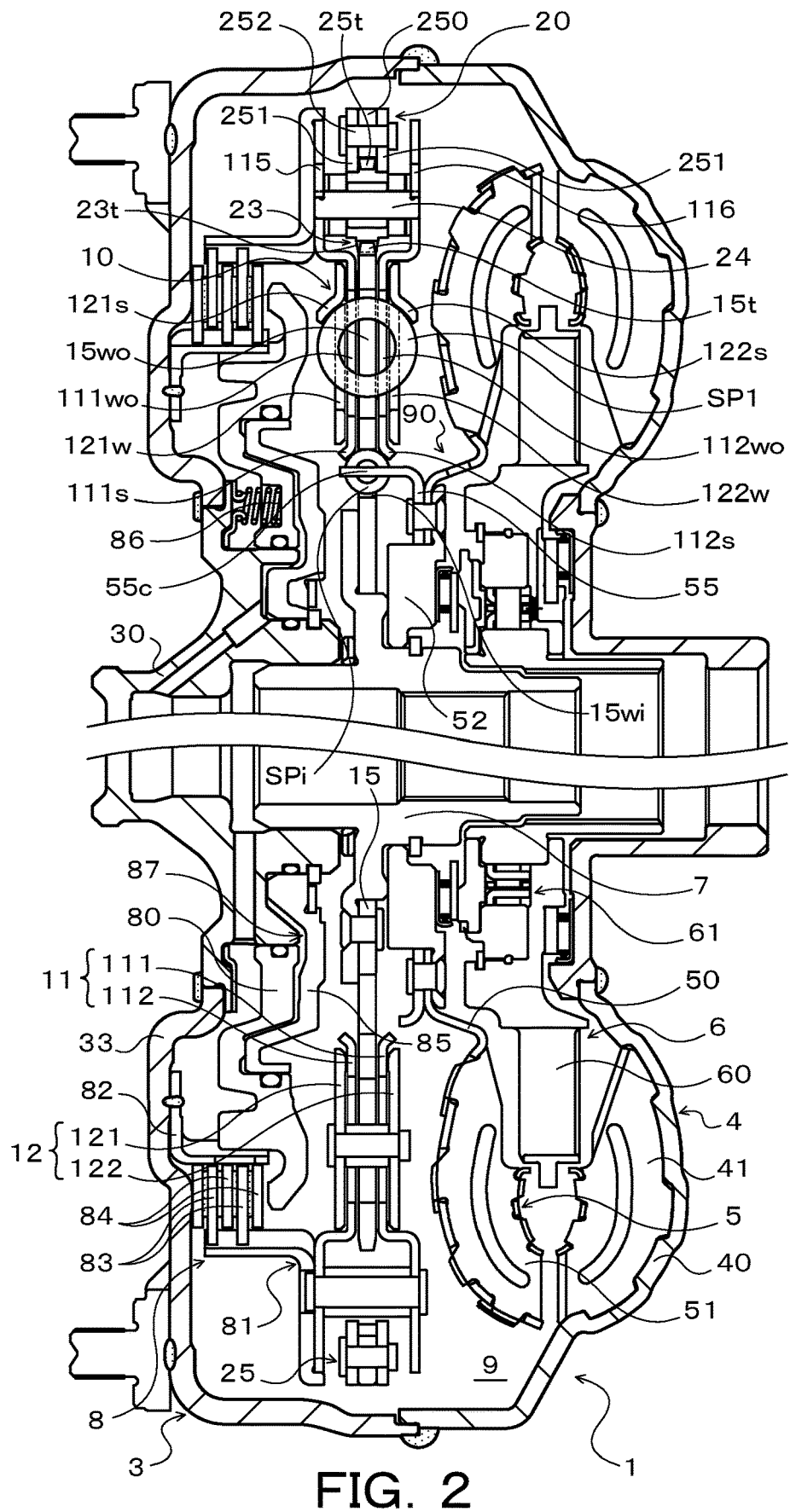
FIG. 2 is a sectional view illustrating the starting device shown in FIG. 1.

FIG. 1 is a schematic configuration diagram illustrating a starting device 1 including a damper device 10 of the present disclosure. FIG. 2 is a sectional view illustrating the starting device 1. The starting device 1 shown in these drawings is mounted on a vehicle equipped with an engine (internal combustion engine) EG as a driving device and includes, in addition to the damper device 10, for example, a front cover 3 as an input member coupled with a crankshaft of the engine EG to receive a torque transmitted from the engine EG; a pump impeller (input-side fluid transmission element) 4 fixed to the front cover 3; a turbine runner (output-side fluid transmission element) 5 arranged to be rotatable coaxially with the pump impeller 4; a damper hub 7 as an output member coupled with the damper device 10 and fixed to an input shaft IS of a transmission TM, which is either an automatic transmission (AT) or a continuously variable transmission (CVT); and a lockup clutch 8.

In the description below, an "axial direction" basically denotes an extending direction of a center axis (axial center) of the starting device 1 or the damper device 10, unless otherwise specified. A "radial direction" basically denotes a radial direction of the starting device 1, the damper device 10 or a rotational element of the damper device 10 or the like or more specifically an extending direction of a straight line extended from the center axis of the starting device 1 or the damper device 10 in a direction perpendicular to the center axis (in a radial direction), unless otherwise specified. A "circumferential direction" basically denotes a circumferential direction of the starting device 1, the damper device 10 or the rotational element of the damper device 10 or the like, or, in other words, a direction along a rotating direction of the rotational element, unless otherwise specified.

As shown in FIG. 2, the pump impeller 4 includes a pump shell 40 closely fixed to the front cover 3 to define a fluid chamber 9 which hydraulic oil flows in; and a plurality of pump blades 41 placed on an inner surface of the pump shell 40. As shown in FIG. 2, the turbine runner 5 includes a turbine shell 50; and a plurality of turbine blades 51 placed on an inner surface of the turbine shell 50. An inner circumferential portion of the turbine shell 50 is fixed to a turbine hub 52 by means of a plurality of rivets, and the turbine hub 52 is supported to be rotatable by the damper hub 7. The pump impeller 4 and the turbine runner 5 are opposed to each other, and a stator 6 is coaxially arranged between the pump impeller 4 and the turbine runner 5 to rectify the flow of the hydraulic oil (working fluid) from the turbine runner 5 to the pump impeller 4. The stator 6 includes a plurality of stator blades 60, and the rotating direction of the stator 6 is set to only one direction by a one-way clutch 61. The pump impeller 4, the turbine runner 5 and the stator 6 form a torus (annular flow path) to circulate the hydraulic oil and serves as a torque converter (fluid transmission device) having a torque amplification function. The stator 6 and the one-way clutch 61 may be omitted from the starting device 1, and the pump impeller 4 and the turbine runner 5 may serve as fluid coupling.

The lockup clutch 8 is configured as a hydraulic multiple disc clutch to establish and release lockup that couples the front cover 3 with the damp hub 7 via the damper device 10. The lockup clutch 8 includes a lockup piston 80 supported to be movable in the axial direction by a center piece 30 that is fixed to the front cover 3; a clutch drum 81; a ring-shaped clutch hub 82 fixed to an inner surface of a side wall portion 33 of the front cover 3 such as to be opposed to the lockup piston 80; a plurality of first frictional engagement plates (friction plates having friction materials on respective surfaces thereof) 83 fit in a spline formed in an inner circumference of the clutch drum 81; and a plurality of second frictional engagement plates (separator plates) 84 fit in a spline formed in an outer circumference of the clutch hub 82.

The lockup clutch 8 also includes a ring-shaped flange member (oil chamber-defining member) 85 mounted to the center piece 30 of the front cover 3 such as to be located on the opposite side to the front cover 3 relative to the lockup piston 80, i.e., to be located on the damper device 10-side and the turbine runner 5-side of the lockup piston 80; and a plurality of return springs 86 placed between the front cover 3 and the lockup piston 80. As illustrated, the lockup piston 80 and the flange member 85 define an engagement oil chamber 87, and hydraulic oil (engagement hydraulic pressure) is supplied from a non-illustrated hydraulic pressure controller to the engagement oil chamber 87. Increasing the engagement hydraulic pressure supplied to the engagement oil chamber 87 moves the lockup piston 80 in the axial direction to press the first frictional engagement plates 83 and the second frictional engagement plates 84 toward the front cover 3, so as to engage (fully engage or slip engage) the lockup clutch 8. The lockup clutch 8 may be configured as a hydraulic single disc clutch.

As shown in FIG. 1 and FIG. 2, the damper device 10 includes a drive member (input element) 11, an intermediate member (intermediate element) 12 and a driven member (output element) 15, as rotational elements. The damper device 10 also includes a plurality of (for example, three according to the embodiment) first springs (first elastic body) SP1 arranged to transmit the torque between the drive member 11 and the intermediate member 12; a plurality of (for example, three according to the embodiment) second springs (second elastic body) SP2 arranged to work respectively in series with the corresponding first springs SP1 and transmit the torque between the intermediate member 12 and the driven member 15; and a plurality of (for example, three according to the embodiment) inner springs (third elastic body) SPi arranged to transmit the torque between the drive member 11 and the driven member 15, as torque transmission elements (torque transmission elastic body).

More specifically, as shown in FIG. 1, the damper device 10 has a first torque transmission path TP1 and a second torque transmission path TP2 that are provided in parallel to each other between the drive member 11 and the driven member 15. The first torque transmission path TP1 is formed by the plurality of first springs SP1, the intermediate member 12 and the plurality of second springs SP2 and transmits the torque between the drive member 11 and the driven member 15 via these elements. According to the embodiment, coil springs having identical specifications (spring constants) are employed as the first springs SP1 and the second springs SP2 constituting the first torque transmission path TP1. Coil springs having different spring constants may be employed as the first springs SP1 and the second springs SP2.

The second torque transmission path TP2 is formed by the plurality of inner springs SPi and transmits the torque between the drive member 11 and the driven member 15 via the plurality of inner springs SPi working in parallel to one another. According to the embodiment, the plurality of inner springs SPi forming the second torque transmission path TP2 work in parallel to the first springs SP1 and the second springs SP2 constituting the first torque transmission path TP1, when an input torque into the drive member 11 reaches a predetermined torque (first reference value) T1 that is smaller than a torque T2 (second reference value) corresponding to a maximum torsion angle $\theta$max of the damper device 10 and a torsion angle of the drive member 11 relative to the driven member 15 becomes equal to or larger than a predetermined angle $\theta$ref. Accordingly, the damper device 10 has two-step (two-stage) damping characteristics.

According to the embodiment, linear coil springs formed from a metal material helically wound to have an axial center extended straight under no application of a load are employed as the first springs SP1, the second springs SP2 and the inner springs SPi. This configuration enables the first springs SP1, the second springs SP2 and the inner springs SPi to be more appropriately stretched and contracted along the axial center, compared with a configuration employing arc coil springs. As a result, this configuration reduces a hysteresis or more specifically a difference between a torque transmitted from the second springs SP2 and the like to the driven member 15 in the process of increasing a relative displacement between the drive member 11 (input element) and the driven member 15 (output element) and a torque transmitted from the second springs SP2 and the like to the driven member 15 in the process of decreasing the relative displacement between the drive member 11 and the driven member 15. Arc coil springs may be employed as at least any of the first springs SP1, the second springs SP2 and the inner springs SPi.

As shown in FIG. 2, the drive member 11 of the damper device 10 includes a ring-shaped first input plate member 111 that is coupled with the clutch drum 81 of the lockup clutch 8; and a ring-shaped second input plate member 112 that is coupled with the first input plate member 111 by means of a plurality of rivets such as to be opposed to the first input plate member 111. Accordingly, the drive member 11 or more specifically the first input plate member 111 and the second input plate member 112 rotate integrally with the clutch drum 81, and the front cover 3 (engine EG) and the drive member 11 of the damper device 10 are coupled with each other by engagement of the lockup clutch 8.

The first input plate member 111 includes a plurality of (for example, three according to the embodiment) outer spring placing windows 111wo that are respectively extended in an arc shape and that are placed at intervals (at equal intervals) in the circumferential direction; a plurality of (for example, three according to the embodiment) non-illustrated inner spring placing windows (cuts) that are respectively extended in an arc shape and that are placed at intervals (at equal intervals) in the circumferential direction to be arranged on an inner side in the radial direction of the respective outer spring placing windows 111wo; a plurality of (for example, three according to the embodiment) spring support portions ills that are extended along outer edges of the respective inner spring placing windows of the first input plate member 111; a plurality of (for example, three according to the embodiment) non-illustrated outer spring contact portions; and a plurality of (for example, six according to the embodiment) inner spring contact structures 111$ci$ (as shown in FIG. 1). The respective inner spring placing windows of the first input plate member 111 have a circumference longer than the natural length of the inner springs SPi. Each of the outer spring contact portions of the first input plate member 111 is provided between adjacent outer spring placing windows 111wo that adjoin to each other along the circumferential direction. Additionally, the inner spring contact portions 111$ci$ are provided on respective sides in the circumferential direction of each of the inner spring placing windows of the first input plate member 111.

The second input plate member 112 includes a plurality of (for example, three according to the embodiment) outer spring placing windows 112wo that are respectively extended in an arc shape and that are placed at intervals (at equal intervals) in the circumferential direction; a plurality of (for example, three according to the embodiment) non-illustrated inner spring placing windows (cuts) that are respectively extended in an arc shape and that are placed at intervals (at equal intervals) in the circumferential direction to be arranged on an inner side in the radial direction of the respective outer spring placing windows 112wo; a plurality of (for example, three according to the embodiment) spring support portions 112$s$ that are extended along outer edges of the respective inner spring placing windows of the second input plate member 112; a plurality of (for example, three according to the embodiment) non-illustrated outer spring contact portions; and a plurality of (for example, six according to the embodiment) inner spring contact portions 112$ci$ (as shown in FIG. 1). The respective inner spring placing windows of the second input plate member 112 have a circumference longer than the natural length of the inner springs SPi. Each of the outer spring contact portions of the first input plate member 112 is provided between adjacent outer spring placing windows 112wo that adjoin to each other along the circumferential direction. Additionally, the inner spring contact portions 112ci are provided on respective sides in the circumferential direction of each of the inner spring placing windows of the second input plate member 112. According to the embodiment, components of an identical shape are employed as the first input plate member 111 and the second input plate member 112. This configuration reduces the number of different types of components.

The intermediate member 12 includes a ring-shaped first intermediate plate member 121 that is placed on the front cover 3-side of the first input plate member 111 of the drive member 11; and a ring-shaped second intermediate plate member 122 that is placed on the turbine runner 5-side of the second input plate member 112 of the drive member 11 and that is coupled with (fixed to) the first intermediate plate member 121 by means of a plurality of rivets. As shown in FIG. 2, the first intermediate plate member 121 and the second intermediate plate member 122 are arranged such that the first input plate member 111 and the second input plate member 112 are placed between the first and second intermediate plate members 121 and 122 in the axial direction of the damper device 10.

The first intermediate plate member 121 includes a plurality of (for example, three according to the embodiment) spring placing windows 121w that are respectively extended in an arc shape and that are placed at intervals (at equal intervals) in the circumferential direction; a plurality of (for example, three according to the embodiment) spring support portions 121s that are extended along outer edges of the respective corresponding spring placing windows 121w; and a plurality of (for example, three according to the embodiment) non-illustrated spring contact portions. Each of the spring contact portions of the first intermediate plate member 121 is provided between adjacent spring placing windows 121w that adjoin to each other along the circumferential direction. The second intermediate plate member 122 includes a plurality of (for example, three according to the embodiment) spring placing windows 122w that are respectively extended in an arc shape and that are placed at intervals (at equal intervals) in the circumferential direction; a plurality of (for example, three according to the embodiment) spring support portions 122s that are extended along outer edges of the respective corresponding spring placing windows 122w; and a plurality of (for example, three according to the embodiment) non-illustrated spring contact portions. Each of the spring contact portions of the second intermediate plate member 122 is provided between adjacent spring placing windows 122w that adjoin to each other along the circumferential direction. According to the embodiment, components of an identical shape are employed as the first intermediate plate member 121 and the second intermediate plate member 122. This configuration reduces the number of different types of components.

Figure 3:
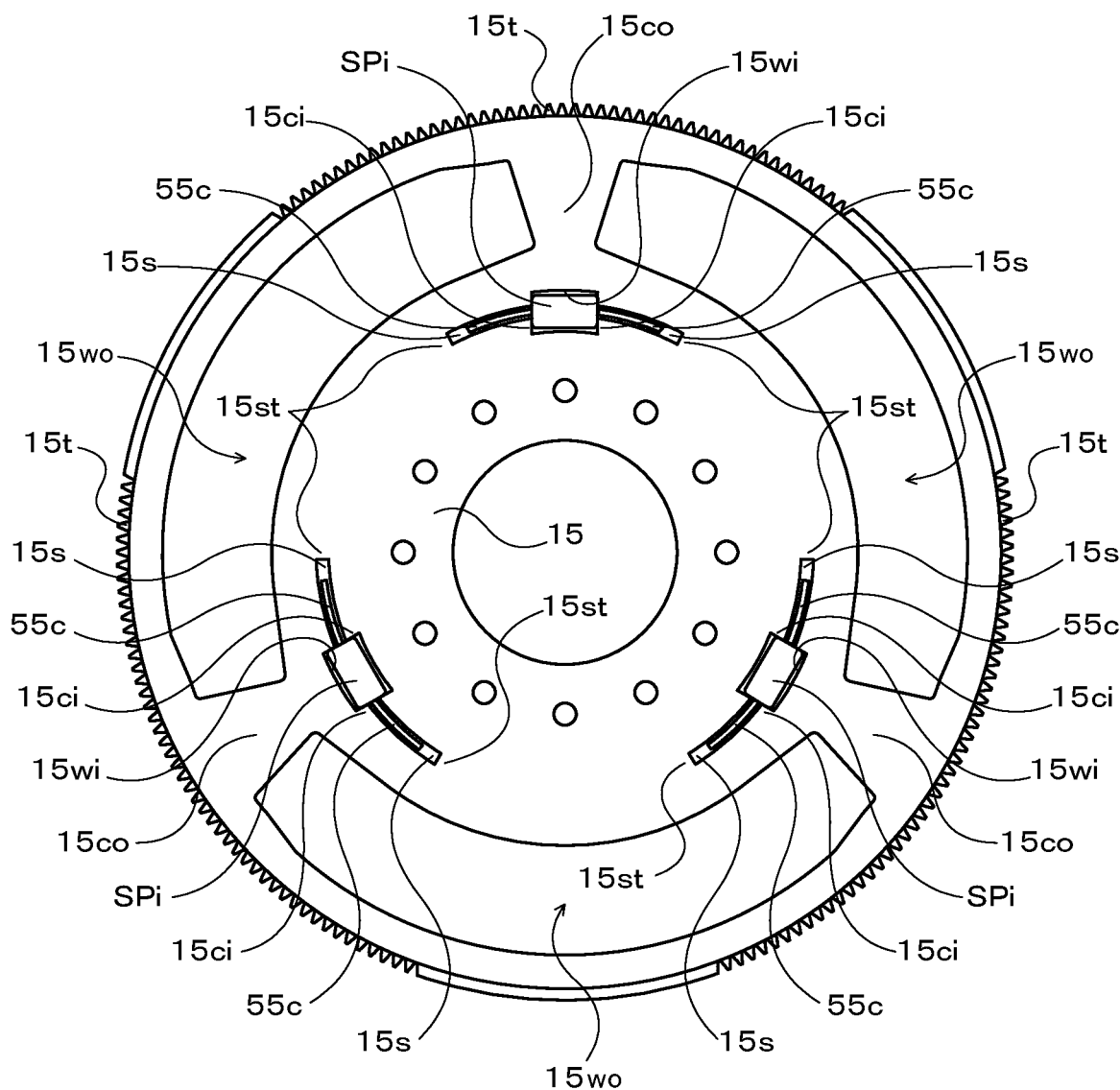
FIG. 3 is a front view illustrating an output element of the damper device of the present disclosure.

The driven member 15 is configured as a plate-like ring-shaped member, is placed between the first input plate member 111 and the second input plate member 112 in the axial direction, and is fixed to the damper hub 7 by means of a plurality of rivets. As shown in FIG. 3, the driven member 15 includes a plurality of (for example, three according to the embodiment) outer spring placing windows 15wo that are respectively extended in an arc shape and that are placed at intervals (at equal intervals) in the circumferential direction; a plurality of (for example, three according to the embodiment) inner spring placing windows 15wi that are placed at intervals (at equal intervals) in the circumferential direction to be arranged on an inner side in the radial direction of the respective outer spring placing windows 15wo; a plurality of (for example, three according to the embodiment) outer spring contact portions 15co; and a plurality of (for example, six according to the embodiment) inner spring contact portions 15ci. Each of the outer spring contact portions 15co is provided between adjacent outer spring placing windows 15wo that adjoin to each other along the circumferential direction. The respective inner spring placing windows 15wi have a circumference corresponding to the natural length of the inner springs SPi. Additionally, the inner spring contact portions 15ci are provided on respective sides in the circumferential direction of each of the inner spring placing windows 15wi.

One first spring SP1 and one second spring SP2 are arranged to be paired (i.e., to work in series) in the outer spring placing windows 111wo of the first input plate member 111, the outer spring placing windows 112wo of the second input plate member 112, and the outer spring placing windows 15wo of the driven member 15. In the mounted state of the damper device 10, each of the outer spring contact portions of the first and the second input plate members 111 and 112 and the outer spring contact portions 15co of the driven member 15 is located between the first spring SP1 and the second spring SP2 that are placed in different outer spring placing windows 15wo, 111wo and 112wo not to be paired (i.e., not to work in series) and is arranged to contact with ends of the first spring SP1 and the second spring SP2.

Furthermore, each of the spring contact portions of the first and the second intermediate plate members 121 and 122 is placed between the first spring SP1 and the second spring SP2 that are placed in identical outer spring placing windows 15wo, 111wo and 112wo to be paired and is arranged to contact with ends of the first spring SP1 and the second spring SP2. The first spring SP1 and the second spring SP2 that are placed in different outer spring placing windows 15wo, 111wo and 112wo and that are not paired (i.e., not to work in series) are placed in the spring placing windows 121w and 122w of the first and the second intermediate plate members 121 and 122. Additionally, the first spring SP1 and the second spring SP2 that are not paired are supported (guided) from outer side in the radial direction by the spring support portions 121s of the first intermediate plate member 121 on the front cover 3-side and are also supported (guided) from outer side in the radial direction by the spring support portions 122s of the second intermediate plate member 122 on the turbine runner 5-side.

The first springs SP1 and the second springs SP2 are thus arranged alternately in the circumferential direction of the damper device 10. One end of each of the first springs SP1 contacts with the corresponding outer spring contact portions of the first and the second input plate members 111 and 112 (drive member 11), and the other end of each of the first springs SP1 contacts with the corresponding spring contact portions of the first and the second intermediate plate members (intermediate member 12). One end of each of the second springs SP2 contacts with on the corresponding spring contact portions of the first and the second intermediate plate members (intermediate member 12), and the other end of each of the second springs SP2 contacts with the corresponding outer spring contact portion 15co of the driven member 15.

As a result, the first spring SP1 and the second spring SP2 that are paired are coupled in series via the corresponding spring contact portions of the first and the second intermediate plate members (intermediate member 12) between the drive member 11 and the driven member 15. In the damper device 10, this configuration reduces the stiffness of the elastic body serving to transmit the torque between the drive member 11 and the driven member 15, i.e., reduces a combined spring constant of the first and the second springs SP1 and SP2. According to the embodiment, the plurality of first springs SP1 and the plurality of second springs SP2 are respectively arranged on an identical circumference, such that the distances between the axial center of the starting device 1 or the damper device 10 and the axial centers of the respective first springs SP1 and the distances between the axial center of the starting device 1 or the like and the axial centers of the respective second springs SP2 are equal to each other.

The inner spring SPi is placed in each of the inner spring placing windows 15wi of the driven member 15. In the mounted state of the damper device 10, each of the inner spring contact portions 15ci contacts with a corresponding end of the inner spring SPi. Additionally, in the mounted state of the damper device 10, a front cover 3-side lateral portion of each of the inner springs SPi is placed in a center part in the circumferential direction of the corresponding inner spring placing window of the first input plate member 111 and is supported (guided) from outside in the radial direction by the spring support portion 111s of the first input plate member 111. In the mounted state of the damper device 10, a turbine runner 5-side lateral portion of each of the inner springs SPi is placed in a center part in the circumferential direction of the corresponding inner spring placing window of the second input plate member 112 and is supported (guided) from outside in the radial direction by the spring support portion 112s of the second input plate member 112.

As shown in FIG. 2, each of the inner springs SPi is accordingly placed in an inner circumferential region in the fluid chamber 9 and is supported by the first spring SP1 and the second spring SP2. As a result, this configuration further shortens the axial length of the damper device 10 and thereby the axial length of the starting device 1. One end of each of the inner springs SPi contacts with one of the inner spring contact portions 111ci and 112ci provided on respective sides of the corresponding inner spring placing windows of the first and the second input plate members 111 and 112, when the input torque (drive torque) into the drive member 11 or the torque (driven torque) applied from the axel side to the driven member 15 reaches the torque T1 and the torsion angle of the drive member 11 relative to the driven member 15 becomes equal to or larger than the predetermined angle θref.

The damper device 10 also includes a non-illustrated stopper configured to restrict the relative rotation between the drive member 11 and the driven member 15. The stopper restricts the relative rotation between the drive member 11 and the driven member 15 when the input torque into the drive member 11 reaches the torque T2 corresponding to the maximum torsion angle θmax of the damper device 10. This results in restricting all deflections of the first springs SP1, the second springs SP2 and the inner springs SPi.

As shown in FIG. 1, the damper device 10 additionally includes a rotary inertia mass damper 20 that is arranged parallel to both the first torque transmission path TP1 including the plurality of first springs SP1, the intermediate member 12 and the plurality of second springs SP2 and the second torque transmission path TP2 including the plurality of inner springs SPi. According to the embodiment, the rotary inertia mass damper 20 includes a single pinion-type planetary gear 21 that is placed between the drive member 11 as the input element of the damper device 10 and the driven member 15 as the output element.

According to the embodiment, the planetary gear 21 is comprised of the driven member 15 that has external teeth 15t on its outer circumference and that serves as a sun gear, the first and the second input plate members 111 and 112 that rotatably support a plurality of (for example, three according to the embodiment) pinion gears 23 respectively engaging with the external teeth 15t and that serve as a carrier, and a ring gear 25 that has internal teeth 25t engaging with the respective pinion gears 23 and that is arranged concentrically with the driven member 15 (external teeth 15t) as the sun gear. Accordingly, the driven member 15 as the sun gear, the plurality of pinion gears 23, and the ring gear 25 at least partly overlap with the first and the second springs SP1 and SP2 (and the inner springs SPi) in the fluid chamber 9 in the axial direction when being viewed in the radial direction of the damper device 10.

As shown in FIG. 2 and FIG. 3, the external teeth 15t are formed at a plurality of locations determined at intervals (at equal intervals) in the circumferential direction in an outer circumferential surface of the driven member 15. Accordingly, the external teeth 15t are located on the outer side in the radial direction of the first springs SP1, the second springs SP2 and the inner springs SPi serving to transmit the torque between the drive member 11 and the driven member 15. The external teeth 15t may be formed around the entire outer circumference of the driven member 15.

As shown in FIG. 2, the first input plate member 111 constituting the carrier of the planetary gear 21 includes a plurality of (for example, three according to the embodiment) pinion gear support portions 115 that are arranged at intervals (at equal intervals) in the circumferential direction on the outer side in the radial direction of the outer spring placing windows 111wo (outer spring contact portions). Similarly, as shown in FIG. 2, the second input plate member 112 constituting the carrier of the planetary gear 21 includes a plurality of (for example, three according to the embodiment) pinion gear support portions 116 that are arranged at intervals (at equal intervals) in the circumferential direction on the outer side in the radial direction of the outer spring placing windows 112wo (outer spring contact portions).

Figure 4:
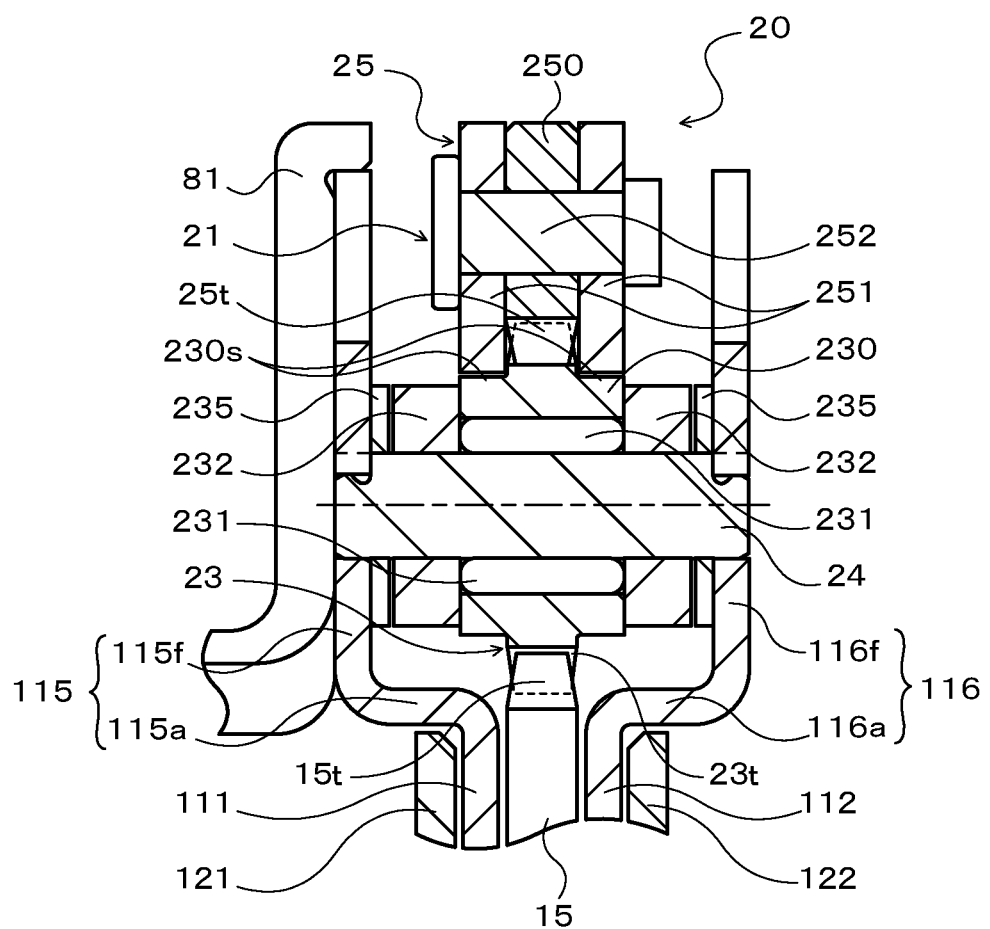
FIG. 4 is a main-part enlarged sectional view illustrating a rotary inertia mass damper included in the damper device of the present disclosure.

As shown in FIG. 4, each of the pinion gear support portions 115 of the first input plate member 111 includes an arc-shaped protruded portion 115a that is formed to be protruded toward the front cover 3-side, and an arc-shaped flange portion 115f that is extended outward in the radial direction from an end of the protruded portion 115a. Each of the pinion gear support portions 116 of the second input plate member 112 includes an arc-shaped protruded portion 116a that is formed to be protruded toward the turbine runner 5-side, and an arc-shaped flange portion 116f that is extended outward in the radial direction from an end of the protruded portion 116a.

Each of the pinion gear support portions 115 (flange portions 115f) of the first input plate member 111 is opposed in the axial direction to the corresponding pinion gear support portion 116 (flange portion 116f) of the second input plate member 112, and the paired flange portions 115f and 116f support an end of a pinion shaft 24 inserted in the pinion gear 23. According to the embodiment, the pinion gear support portions 115 (flange portions 115f) of the first input plate member 111 are respectively clamped to the clutch drum 81 of the lockup clutch 8 by means of rivets. Furthermore, according to the embodiment, the first intermediate plate member 121 constituting the intermediate member 12 is aligned by inner circumferential surfaces of the protruded portions 115a of the pinion gear support portions 115. The second intermediate plate member 122 constituting the intermediate member 12 is aligned by inner circumferential surfaces of the protruded portions 116a of the pinion gear support portions 116.

As shown in FIG. 4, the pinion gear 23 of the planetary gear 21 includes a ring-shaped gear main body 230 that has gear teeth (external teeth) 23t on its outer circumference; a plurality of needle bearings 231 that are placed between an inner circumferential surface of the gear main body 230 and an outer circumferential surface of the pinion shaft 24; and a pair of spacers 232 that are fit on respective ends of the gear main body 230 to restrict the movements of the needle bearings 231 in the axial direction. As shown in FIG. 4, the gear main body 230 of the pinion gear 23 includes ring-shaped radial direction support portions 230s that are protruded on respective sides in the axial direction of the gear teeth 23t on the inner circumferential side of bottoms of the gear teeth 23t in the radial direction of the pinion gear 23 and that have outer circumferential surfaces in a cylindrical shape. The outer circumferential surface of each spacer 232 is formed to have a diameter that is equal to the diameter of the radial direction support portion 230s or that is smaller than the diameter of the radial direction support portion 230s.

The plurality of pinion gears 23 are rotatably supported by the first and the second input plate members 111 and 112 (pinion gear support portions 115 and 116) serving as the carrier to be arrayed at intervals (at equal intervals) in the circumferential direction. Washers 235 are placed between side surfaces of the respective spacers 232 and the pinion gear support portions 115 and 116 (flange portions 115f and 116f) of the first and second input plate members 111 and 112. Gaps are formed between respective side surfaces of the gear teeth 23t of the pinion gears 23 and the pinion gear support portions 115 and 116 (flange portions 115f and 116f) of the first and second input plate members 111 and 112 in the axial direction, as shown in FIG. 4.

The ring gear 25 of the planetary gear 21 includes a ring-shaped gear main body 250 that has internal teeth 25t on its inner circumference; two side plates 251 that are respectively formed in an annular shape; and a plurality of rivets 252 that are provided to fix the respective side plates 251 to respective side surfaces in the axial direction of the gear main body 250. The gear main body 250, the two side plates 251 and the plurality of rivets 252 are integrated to serve as an inertial mass body (first mass body) of the rotary inertia mass damper 20. According to the embodiment, the internal teeth 25t is formed around the entire inner circumferential surface of the gear main body 250. The internal teeth 25t may be formed at a plurality of locations determined at intervals (at equal intervals) in the circumferential direction in the inner circumferential surface of the gear main body 250.

Each of the side plates 251 serves as a supported portion that has an inner circumferential surface of a recessed cylindrical shape and that is supported in the axial direction by the plurality of pinion gears 23 engaging with the internal teeth 25t. More specifically, the two side plates 251 are fixed to corresponding side surfaces of the gear main body 250 on the respective sides in the axial direction of the internal teeth 25t such as to be protruded to an inner side in the radial direction of the bottoms of the internal teeth 25t and to be opposed to at least the side surfaces of the gear teeth 23t of the pinion gear 23. According to the embodiment, an inner circumferential surface of each side plate 251 is located on a slightly inner side in the radial direction of tips of the internal teeth 25t as shown in FIG. 4.

When the respective pinion gears 23 are engaged with the internal teeth 25t, the inner circumferential surfaces of the respective side plates 251 are supported in the radial direction by the corresponding radial direction support portions 230s of the pinion gear 23 (gear main body 230). This configuration enables the ring gear 25 to be aligned with high accuracy relative to the axial center of the driven member 15 serving as the sun gear by the radial direction support portions 230s of the plurality of pinion gears 23 and to smoothly rotate (oscillate). When the respective pinion gears 23 are engaged with the internal teeth 25t, the inner surfaces of the respective side plates 251 are opposed to side surfaces of the gear teeth 23t of the pinion gear 23 and side surfaces of portions from the bottoms of the gear teeth 23t to the radial direction support portions 230s. The movement in the axial direction of the ring gear 25 is accordingly restricted by at least the side surfaces of the gear teeth 23t of the pinion gear 23. Additionally, gaps are formed between outer surfaces of the respective side plates 251 of the ring gear 25 and the pinion gear support portions 115 and 116 (flange portions 115f and 116f) of the first and second input plate members 111 and 112 in the axial direction, as shown in FIG. 4.

Additionally, in the damper device 10, the turbine runner 5 (and the turbine hub 52) are coupled the respective inner springs SPi via a coupling member 55. The coupling member 55 is formed in an annular shape and is fixed to the turbine shell 50 of the turbine runner 5 and to the turbine hub 52 by means of a plurality of rivets. The coupling member 55 has a plurality of (for example, six according to the embodiment) spring contact portions 55c that are extended in the axial direction from its outer circumferential portion. As shown in FIG. 3, the plurality of spring contact portions 55c are arranged in pairs at intervals in the circumferential direction, and the paired two spring contact portions 55c are opposed to each other across an interval according to the natural length of the inner spring SPi.

The driven member 15 arranged to hold the inner springs SPi has a plurality of (for example, six according to the embodiment) ended slits 15s formed to be located on respective sides in the circumferential direction of the respective inner spring placing windows 15wi that respectively place the inner springs SPi therein. Each of the ended slits 15s is arranged to communicate on its one end side with the corresponding inner spring placing window 15wi and is extended in an arc shape along a circumference passing through the center of an end of the inner spring SPi such as to be away from an end face of the inner spring contact portion 15ci that contacts with the inner spring SPi. The respective ended slits 15s have a circumference that is determined to be longer than the circumference of the respective spring contact portions 55c of the coupling member 55. As shown in FIG. 3, the spring contact portion 55c of the coupling member 55 is inserted in each of the ended slit 15s. In the mounted state of the damper device 10, each of the spring contact portions 55c of the coupling member 55 contacts with an end of the corresponding inner spring SPi, and a gap is formed between each spring contact portion 55c and a portion defining a closed end of each ended slit 15s of the driven member 15.

The turbine runner 5, the turbine hub 52 and the coupling member 55 are coupled with the driven member 15 that serves as the output element of the damper device 10, via the plurality of inner springs SPi. The turbine runner 5, the turbine hub 52 and the coupling member 55 serving as an inertial mass body (second mass body) and the plurality of inner springs SPi (elastic body) arranged in parallel between these components of the inertial mass body and the driven member 15 constitute a dynamic damper 90 when the torsion angle of the drive member 11 relative to the driven member 15 is smaller than the predetermined angle θref and the inner spring contact portions 111$ci$ and 112$ci$ of the first and the second input plate members 111 and 112 do not contacts with the ends of the respective inner springs SPi. The inner springs SPi are also used as the elastic body of the dynamic damper 90, so that there is no need to provide an exclusive elastic body in the dynamic damper 90. This configuration thus effectively suppresses size expansion of the damper device 10.

The "dynamic damper" is configured by coupling the elastic body (springs) with the mass body such that a vibrating body (driven member 15 according to the embodiment) is not included in the transmission path of the torque (average torque) and serves to damp the vibration by applying a vibration in an opposite phase to the vibrating body at a frequency (engine rotation speed) that is equal to a resonance frequency of the vibrating body. More specifically, the dynamic damper 90 can damp the vibration of a desired frequency by adjusting the spring constant (stiffness) of the inner springs SPi and the weight of the turbine runner 5 and the like as the mass body.

The ended slits 15$s$ are formed on the respective sides in the circumferential direction of the inner spring placing window 15$wi$ of the driven member 15. This configuration causes the inner spring contact portion 15$ci$ of the driven member 15 and the spring contact portion 55$c$ of the coupling member 55 to intersect with each other (to be orthogonal to each other) and to overlap with the center of an end of the inner spring SPi, such that both the inner spring contact portion 15$ci$ and the spring contact portion 55$c$ press the periphery of the center of the end of the inner spring SPi. This configuration accordingly causes the inner spring SPi to be more appropriately stretched and contracted along the axial center and reduces a hysteresis or more specifically a frictional force applied to the inner spring SPi in the course of decreasing a load. According to the embodiment, the circumference of the ended slit 15$s$ is determined such that each spring contact portion 55$c$ of the coupling member 55 contacts with a stopper portion 15$st$ provided in the driven member 15 to define the closed end of each ended slit 15$s$, prior to complete contraction of each inner spring SPi. Accordingly, when one of the paired spring contact portions 55$c$ contacts with the corresponding stopper portion 15$st$ of the driven member 15 accompanied with rotation of the turbine runner 5, the turbine runner 5 and the driven member 15 are integrally rotated via the inner spring SPi that is not completely contracted.

In the starting device 1 configured as described above, as understood from FIG. 1, in the state that the lockup by the lockup clutch 8 is released, the torque (power) transmitted from the engine EG to the front cover 3 is transmitted to the input shaft IS of the transmission TM through the path of the pump impeller 4, the turbine runner 5, the driven member 15 integrally rotating with the turbine runner 5 via the coupling member 55 and the inner springs SPi, and the damper hub 7.

In the state that the lockup is established by the lockup clutch 8 of the starting device 1, on the other hand, the torque transmitted from the engine EG to the drive member 11 through the front cover 3 and the lockup clutch 8 is transmitted to the driven member 15 and the damper hub 7 via the first torque transmission path TP1 including the plurality of first springs SP1, the intermediate member 12 and the plurality of second springs SP2 and the rotary inertia mass damper 20, when the input torque is smaller than the torque T1 described above and the torsion angle of the drive member 11 relative to the driven member 15 is smaller than the predetermined angle θref. When the input torque becomes equal to or larger than the torque T1 described above, the torque transmitted to the drive member 11 is transmitted to the driven member 15 and the damper hub 7 via the first torque transmission path TP1, the second torque transmission path TP2 including the plurality of inner springs SPi, and the rotary inertia mass damper 20.

When the drive member 11 is rotated (twisted) relative to the driven member 15 in the established state of the lockup (in the engaged state of the lockup clutch 8), the first springs SP1 and the second springs SP2 are deflected, and the ring gear 25 as the mass body rotates (oscillates) around the axial center accompanied with the relative rotation between the drive member 11 and the driven member 15. When the drive member 11 is rotated (swung) relative to the driven member 15, the rotation speed of the drive member 11 or more specifically the first and the second input plate members 111 and 112 as the carrier that is the input element of the planetary gear 21 becomes higher than the rotation speed of the driven member 15 as the sun gear. Accordingly, in this state, the ring gear 25 is accelerated by the function of the planetary gear 21 to be rotated at the higher rotation speed than that of the drive member 11. An inertia torque is then applied from the ring gear 25 that is the mass body of the rotary inertia mass damper 20 to the driven member 15 that is the output element of the damper device 10 via the pinion gears 23. This damps the vibration of the driven member 15. The rotary inertia mass damper 20 serves to mainly transmit the inertia torque between the drive member 11 and the driven member 15, while not transmitting the average torque.

Additionally, the turbine runner 5 and the like as the mass body and the plurality of inner springs SPi as the elastic body coupled with the turbine runner 5 and the like and with the driven member 15 constitute the dynamic damper 90, when the torsion angle of the drive member 11 relative to the driven member 15 is smaller than the predetermined angle θref and the inner spring contact portions 111$ci$ and 112$ci$ of the first and the second input plate members 111 and 112 do not contact with the ends of the respective inner springs SPi. This dynamic damper 90 serves to apply a vibration in an opposite phase to the phase of the vibration of the driven member 15, to the driven member 15 and thereby damp the vibration of the driven member 15.

Figure 5:
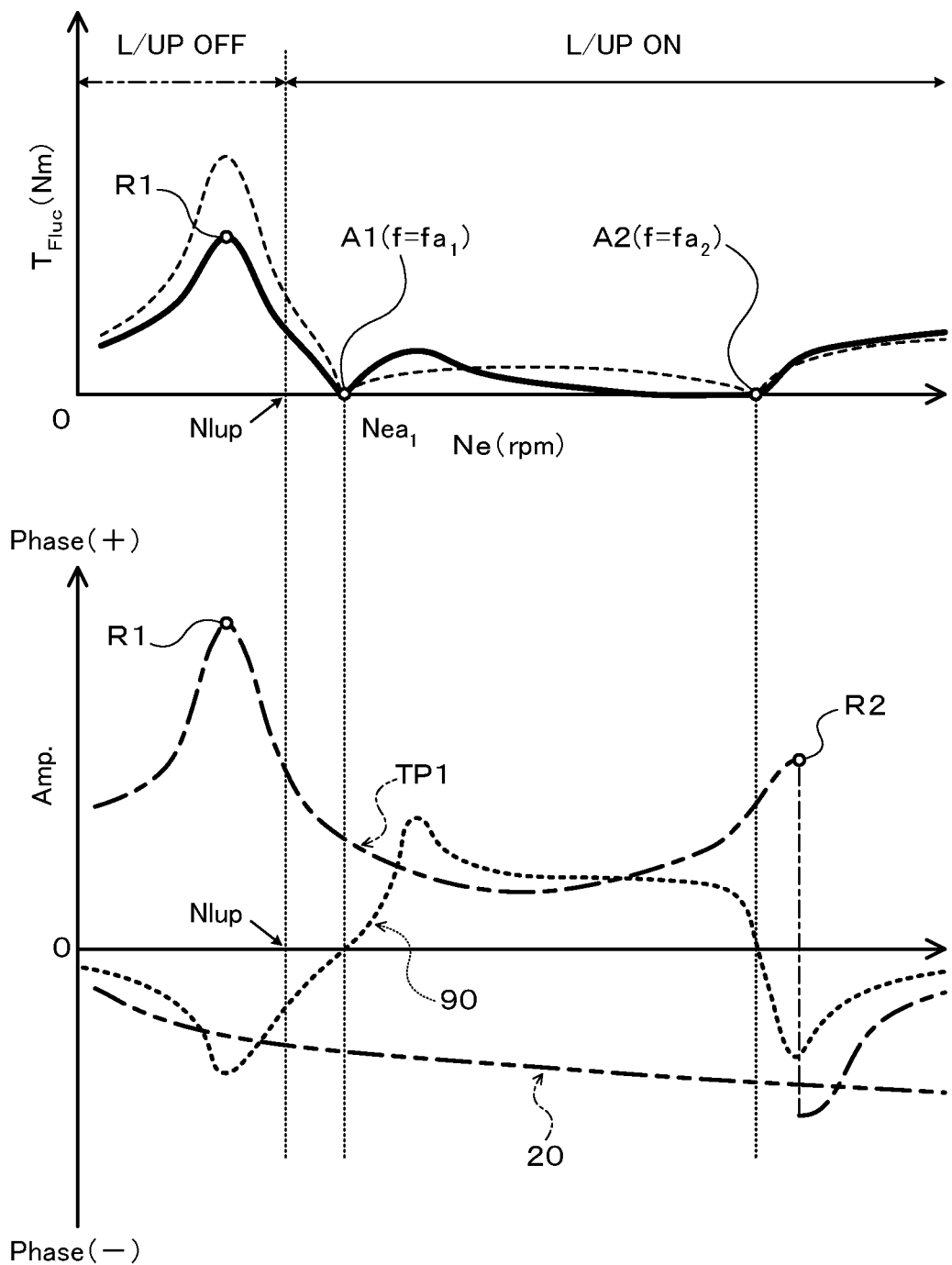

The following describes in detail the principle of damping the vibration by the damper device 10 with reference to FIG. 5.

As described above, in the damper device 10, the first and the second springs SP1 and SP2 included in the first torque transmission path TP1 and the rotary inertia mass damper 20 work in parallel until the input torque transmitted to the drive member 11 reaches the torque T1 described above. While the first and the second springs SP1 and SP2 and the rotary inertia mass damper 20 work in parallel, the torque transmitted from the first torque transmission path TP1 including the intermediate member 12 and the first and the second springs SP1 and SP2 to the driven member 15 is dependent on (proportional to) the displacement (amount of deflection, i.e., torsion angle) of the second springs SP2 placed between the intermediate member 12 and the driven member 15. The torque transmitted from the rotary inertia mass damper 20 to the driven member 15 is, on the other hand, dependent on (proportional to) a difference in angular acceleration between the drive member 11 and the driven member 15, i.e., a twice differentiated value of the displacement of the first and the second springs SP1 and SP2 between the drive member 11 and the driven member 15. On the assumption that the input torque T transmitted to the drive member 11 of the damper device 10 periodically vibrates as expressed by $T=T_0 \sin \omega t$ (where "$\omega$" denotes an angular frequency in the periodical fluctuation (vibration) of the input torque T), the phase of the vibration transmitted from the drive member 11 to the driven member 15 via the first torque transmission path TP1 shifts by 180 degrees from the phase of the vibration transmitted from the drive member 11 to the driven member 15 via the rotary inertia mass damper 20.

Furthermore, in the damper device 10 including the intermediate member 12, two natural frequencies (resonance frequencies) may be set in the state that the deflection of the first and the second springs SP1 and SP2 is allowed and the inner springs SPi is not deflected. More specifically, on the assumption that transmission of the torque from the engine EG to the drive member 11 is started in the established state of the lockup by the lockup clutch 8, resonance occurs due to vibrations of the drive member 11 and the driven member 15 in the opposite phases or resonance of mainly the transmission occurs between the drive member 11 and a non-illustrated driveshaft (first resonance, as shown by a resonance point R1 in FIG. 5) in the first torque transmission path TP1, in the state that the deflection of the first and the second springs SP1 and SP2 is allowed and the inner springs SPi is not deflected.

The intermediate member 12 of the first torque transmission path TP1 is formed in a ring shape. In the course of transmission of the torque from the engine EG to the drive member 11, the inertial force applied to the intermediate member 12 becomes larger than the resistance force interfering with the vibration of the intermediate member 12 (mainly, frictional force caused by the centrifugal force applied to the rotating intermediate member 12). A damping ratio of the intermediate member 12 that vibrates accompanied with transmission of the torque from the engine EG to the drive member 11 accordingly becomes less than a value 1. The damping ratio $\zeta$ of the intermediate member 12 in a single-degree-of-freedom system is expressed by $\zeta = C/\{2 \cdot \sqrt{[J_2 \cdot (k_1 + k_2)]}\}$. Herein "$J_2$" denotes a moment of inertia of the intermediate member 12; "$k_1$" denotes a combined spring constant of the plurality of first springs SP1 working in parallel between the drive member 11 and the intermediate member 12; "$k_2$" denotes a combined spring constant of the plurality of second springs SP2 working in parallel between the intermediate member 12 and the driven member 15; and "C" denotes a damping force (resistance force) per unit rate of the intermediate member 12 that interferes with the vibration of the intermediate member 12. Accordingly, the damping ratio of the intermediate member 12 is determined, based on at least the moment $J_2$ of inertia of the intermediate member 12 and the stiffnesses $k_1$ and $k_2$ of the first and the second springs SP1 and SP2.

The above damping force C may be determined as follows. When a displacement x of the intermediate member 12 is given by $x = A \cdot \sin(\omega_{12} \cdot t)$, a lost energy Sc by the above damping force C is expressed as $Sc = \pi \cdot C \cdot A^2 \cdot \omega_{12}$ (where "A" denotes an amplitude and "$\omega_{12}$" denotes a vibration frequency of the intermediate member 12). When the displacement x of the intermediate member 12 is given by $x = A \cdot \sin(\omega_{12} \cdot t)$, a lost energy Sh by the above hysteresis H in one cycle of vibration of the intermediate member 12 is expressed as $Sh = 2 \cdot H \cdot A$. On the assumption that the lost energy Sc by the above damping force C is equal to the lost energy Sh by the hysteresis, the above damping force is expressed as $C = (2 \cdot H)/(\pi \cdot A \cdot \omega_{12})$.

Furthermore, a natural frequency $f_{12}$ of the intermediate member 12 in the single-degree-of-freedom system is expressed as $f_{12} = \frac{1}{2}\pi \cdot \sqrt{\{((k_1 + k_2)/J_2\}}$. Forming the intermediate member 12 in the ring shape provides a relatively large moment of inertia $J_2$, so that the intermediate member 12 has a relatively small natural frequency $f_{12}$. As shown in FIG. 5, resonance of the intermediate member 12 accordingly occurs due to the vibration of the intermediate member 12 in the opposite phase to the phases of the vibrations of both the drive member 11 and the driven member 15 (second resonance, as shown by a resonance point R2 in FIG. 5) in the first torque transmission path TP1, at a stage when a rotation speed Ne of the engine EG (rotation speed of the drive member 11) becomes rather higher than a rotation speed corresponding to the frequency at the resonance point R1 (and the frequency of an antiresonance point A1 described later) in the state that the deflection of the first and the second springs SP1 and SP2 is allowed and the inner springs SPi is not deflected.

The amplitude of the vibration transmitted from the first torque transmission path TP1 (second springs SP2) to the driven member 15 changes from a decrease to an increase before the rotation speed Ne of the engine EG (rotation speed of the drive member 11) reaches a relatively low rotation speed corresponding to the natural frequency of the intermediate member 12, as shown by a one dot chain-line curve in FIG. 5. The amplitude of the vibration transmitted from the rotary inertia mass damper 20 to the driven member 15, on the other hand, gradually increases with an increase in rotation speed of the engine EG (rotation speed of the drive member 11), as shown by a two-dot chain line curve in FIG. 5. Accordingly, in the damper device 10, due to the presence of the intermediate member 12, two peaks or two resonance points (R1 and R2) appear in the torque transmitted via the first torque transmission path TP1, so that two antiresonance points A1 and A2 where a vibration amplitude $\Theta_3$ of the driven member 15 is theoretically zero, may be set as shown by a solid line curve in FIG. 5.

Additionally, in the damper device 10, the dynamic damper 90 coupled with the driven member 15 applies a vibration in the opposite phase to the phase of the vibration of the driven member 15, to the driven member 15. More specifically, when the rotation speed Ne of the engine EG, i.e., the rotation speed of the drive member 11 (frequency of the vibration transmitted to the drive member 11) is low and the inertia torque applied from the rotary inertia mass damper 20 to the driven member 15 decreases, the dynamic damper 90 applies a vibration in the same phase as the phase of the vibration applied from the rotary inertia mass damper 20 to the driven member 15, to the driven member 15, as shown by a dotted line curve in FIG. 5. In other words, the dynamic damper 90 serves to complement the inertia torque applied from the rotary inertia mass damper 20 to the driven member 15 in a lower rotation speed range than the antiresonance point A1, and cancels at least part of the vibration transmitted from the first torque transmission path TP1 to the driven member 15.

When the rotation speed Ne of the engine EG, i.e., the rotation speed of the drive member 11 (frequency of the vibration transmitted to the drive member 11) is high and the inertia torque applied from the rotary inertia mass damper 20 to the driven member 15 increases (to become excess), on the other hand, the dynamic damper 90 applies a vibration in the same phase as the phase of the vibration applied from the first torque transmission path TP1 (second springs SP2)

to the driven member 15, to the driven member 15, as shown by the dotted line curve in FIG. 5. In other words, the dynamic damper 90 works to complement the torque applied from the first torque transmission path TP1 in a rotation speed range between the antiresonance points A1 and A2, and cancels at least part of the inertia torque applied from the rotary inertia mass damper 20 to the driven member 15.

As a result, as shown by the solid line curve in FIG. 5, the damper device 10 more reduces a torque fluctuation $T_{Fluc}$ (vibration level) in the lower rotation speed range than the low rotation-side antiresonance point A1 and in the rotation speed range between the two antiresonance points A1 and A2, compared with a configuration with omission of the dynamic damper 90 from the damper device 10 (as shown by a broken line curve in FIG. 5). Accordingly, this further improves the vibration damping performance of the damper device 10 in a range of relatively low rotation speed Ne of the engine EG (rotation speed of the drive member 11).

Furthermore, according to the embodiment, the frequency of the resonance point of the dynamic damper 90 is made equal to the frequency of the low rotation-side antiresonance point A1. This further decreases a torque fluctuation $T_{Fluc}$ (vibration level) in a range around the antiresonance point A1 or more specifically in the lower rotation speed range than the antiresonance point A1. Decreasing the torque fluctuation $T_{Fluc}$ in the lower rotation speed range than the antiresonance point A1 enables a lockup rotation speed Nlup of the lockup clutch 8 to be set to a lower value than a rotation speed $Nea_1$ of the engine EG corresponding to the frequency of the low rotation-side antiresonance point A1. This enables the torque from the engine EG to be mechanically transmitted to the transmission TM at the lower rotation speed of the engine EG. As a result, this improves the power transmission efficiency between the engine EG and the transmission TM and further improves the fuel consumption of the engine EG. The lockup rotation speed Nlup denotes a rotation speed when the engine EG is first coupled with the damper device 10 after a start of the engine EG and is the lowest rotation speed among a plurality of lockup rotation speeds, i.e., a minimum rotation speed in a rotation speed range where the torque is transmitted from the drive member 11 to the driven member 15 via the first torque transmission path TP1. As shown in FIG. 5, the lockup rotation speed Nlup is higher than a rotation speed corresponding to the resonance frequency at the resonance point R1. The resonance at the resonance point R1 (resonance at the lower natural frequency between the two natural frequencies) is a virtual resonance that does not occur in the rotation speed range used by the damper device 10.

In the damper device 10 including the dynamic damper 90, the torque fluctuation $T_{Fluc}$ (vibration level) increases (causes a rebound) accompanied with damping of the vibration by the dynamic damper 90, immediately after the appearance of the antiresonance point A1. Making the frequency of the resonance point of the dynamic damper 90 equal to the frequency of the low rotation-side antiresonance point A1 to decrease the torque fluctuation $T_{Fluc}$ in the lower rotation speed range than the low rotation-side antiresonance point A1 suppresses an increase in the torque fluctuation $T_{Fluc}$ (vibration level) immediately after the appearance of the antiresonance point A1 and controls the torque fluctuation $T_{Fluc}$ in an allowable range. FIG. 5 shows the torque fluctuation $T_{Fluc}$ and the like without taking into account a hysteresis in the damper device 10. In the actual state, the increase in the torque fluctuation $T_{Fluc}$ (vibration level) immediately after the appearance of the antiresonance point A1 is expected to be attenuated by the hysteresis.

The frequency of the resonance point of the dynamic damper 90 may not be necessarily equal to the frequency of the antiresonance point A1. The dynamic damper 90 may be designed to have a slightly lower frequency of the resonance point than the frequency of the antiresonance point A1 or may be designed to have a slightly higher frequency of the resonance point than the frequency of the antiresonance point A1. For example, on the occurrence of resonance of a shaft of the transmission TM, the frequency of the resonance point of the dynamic damper 90 may be made equal to the frequency of resonance of the shaft.

In the damper device 10 of the embodiment, when the second resonance (shown as the resonance point R2 in FIG. 5) occurs in the first torque transmission path TP1, the intermediate member 12 vibrates in the opposite phase to the phase of the vibration of the driven member 15. As shown by the one-dot chain line curve in FIG. 5, the phase of the vibration transmitted from the drive member 11 to the driven member 15 via the first torque transmission path TP1 becomes the same phase as the phase of the vibration transmitted from the drive member 11 to the driven member 15 via the rotary inertia mass damper 20. When the frequency of the resonance point of the dynamic damper 90 is set close to the frequency of the antiresonance point A1, on the occurrence of the second resonance in the first torque transmission path TP1, the phase of the vibration transmitted from the dynamic damper 90 to the driven member 15 becomes the same phase as the phase of the vibration transmitted from the first torque transmission path TP1 to the driven member 15 and the phase of the vibration transmitted from the rotary inertia mass damper 20 to the driven member 15.

An equation of motion given as Expression (1) may be established in a vibration system including the damper device 10 of the embodiment in the state that the torque is transmitted from the engine EG to the drive member 11 by establishment of the lockup and that the inner springs SPi are not deflected. In Expression (1), "$J_1$" denotes the moment of inertia of the drive member 11; "$J_2$" denotes the moment of inertia of the intermediate member 12 as described above; "$J_3$" denotes the moment of inertia of the driven member 15; and "$J_i$" denotes the moment of inertia of the ring gear 25 that is the mass body of the rotary inertia mass damper 20. Furthermore, "$\theta_1$" denotes the torsion angle of the drive member 11; "$\theta_2$" denotes the torsion angle of the intermediate member 12; "$\theta_3$" denotes the torsion angle of the driven member 15; and "$\lambda$" denotes the gear ratio (pitch circle diameter of the external teeth 15$t$ (sun gear)/pitch circle diameter of the internal teeth 25$t$ of the ring gear 25) of the planetary gear 21 constituting the rotary inertia mass damper 20, i.e., the ratio of the rotation speed of the ring gear 25 as the mass body to the rotation speed of the driven member 15.

[Math. 1]

Furthermore, on the assumption that the input torque T into the drive member 11 periodically vibrates as described above and that the torsion angle $\theta_1$ of the drive member 11, the torsion angle $\theta_2$ of the intermediate member 12 and the torsion angle $\theta_3$ of the driven member 15 periodically respond (vibration) as expressed by $[\theta_1, \theta_2, \theta_3]^T = [\Theta_1, \Theta_2, \Theta_3]^T \cdot \sin \omega t$, an identity given by Expression (2) is obtained. In Expression (2), "$\Theta_1$" denotes the amplitude of the vibration (vibration amplitude, i.e., maximum torsion angle) of the drive member 11 generated by transmission of the torque from the engine EG; "$\Theta_2$" denotes the amplitude of the vibration (vibration amplitude) of the intermediate member 12 generated by transmission of the torque from the engine EG to the drive member 11; and "$\Theta_3$" denotes the amplitude of the vibration (vibration amplitude) of the driven member 15 generated by transmission of the torque from the engine EG to the drive member 11.

[Math. 2]

In Expression (2), when the vibration amplitude $\Theta_3$ of the driven member 15 is equal to 0, the damper device 10 theoretically fully damps the vibration from the engine EG and theoretically causes no vibration to be transmitted to the transmission TM, the driveshaft and the like subsequent to the driven member 15. Accordingly, a conditional expression given by Expression (3) is obtained when the identity of Expression (2) is solved with regard to the vibration amplitude $\Theta_3$ and the vibration amplitude $\Theta_3$ is set equal to 0. Expression (3) is a quadratic equation with regard to a square value of angular frequency $\omega_2$ in the periodic fluctuation of the input torque T. When the square value of angular frequency $\omega_2$ is one of two real roots (or a multiple root) of Expression (3), the vibration from the engine EG transmitted from the first torque transmission path TP1 to the driven member 15 and the vibration transmitted from the rotary inertia mass damper 20 to the driven member 15 are cancelled out each other, so that the vibration amplitude $\Theta_3$ of the driven member 15 theoretically becomes equal to zero. From this point, it is understood that the damper device 10 is capable of setting two antiresonance points where the vibration amplitude $\Theta_3$ of the driven member 15 theoretically becomes equal to zero.

[Math. 3]

Two solutions $\omega_1$ and $\omega_2$ of Expression (3) given above may be obtained from the quadratic formula, where $\omega_1 < \omega_2$. A frequency $fa_1$ of the low rotation-side (low frequency-side) antiresonance point A1 (hereinafter called "minimum frequency") is expressed by Expression (4) given below, and a frequency $fa_2$ ($fa_2 > fa_1$) of the high rotation-side (high frequency-side) antiresonance point A2 is expressed by Expression (5) given below. The rotation speed $Nea_1$ corresponding to the minimum frequency $fa_1$ is expressed by $Nea_1 = (120/n) \cdot fa_1$, where "n" denotes the number of cylinders of the engine EG.

[Math. 4]

The vibration damping performance of the damper device 10 is further improved by selecting and setting the combined spring constant $k_1$ of the plurality of first springs SP1, the combined spring constant $k_2$ of the plurality of second springs SP2, the moment of inertia $J_2$ of the intermediate member 12 and the moment of inertia $J_i$ of the ring gear 25 as the mass body of the rotary inertia mass damper 20, based on the required lockup rotation speed Nlup and the minimum frequency $fa_1$. A multiple root of Expression (3) ($=\frac{1}{2}\pi \cdot \sqrt{\{(k_1+k_2)/(2 \cdot J_2)\}}$) may be set as the minimum frequency $fa_1$ according to the specifications of the vehicle which the damper device 10 is applied to, the prime mover and the like.

Figure 6:
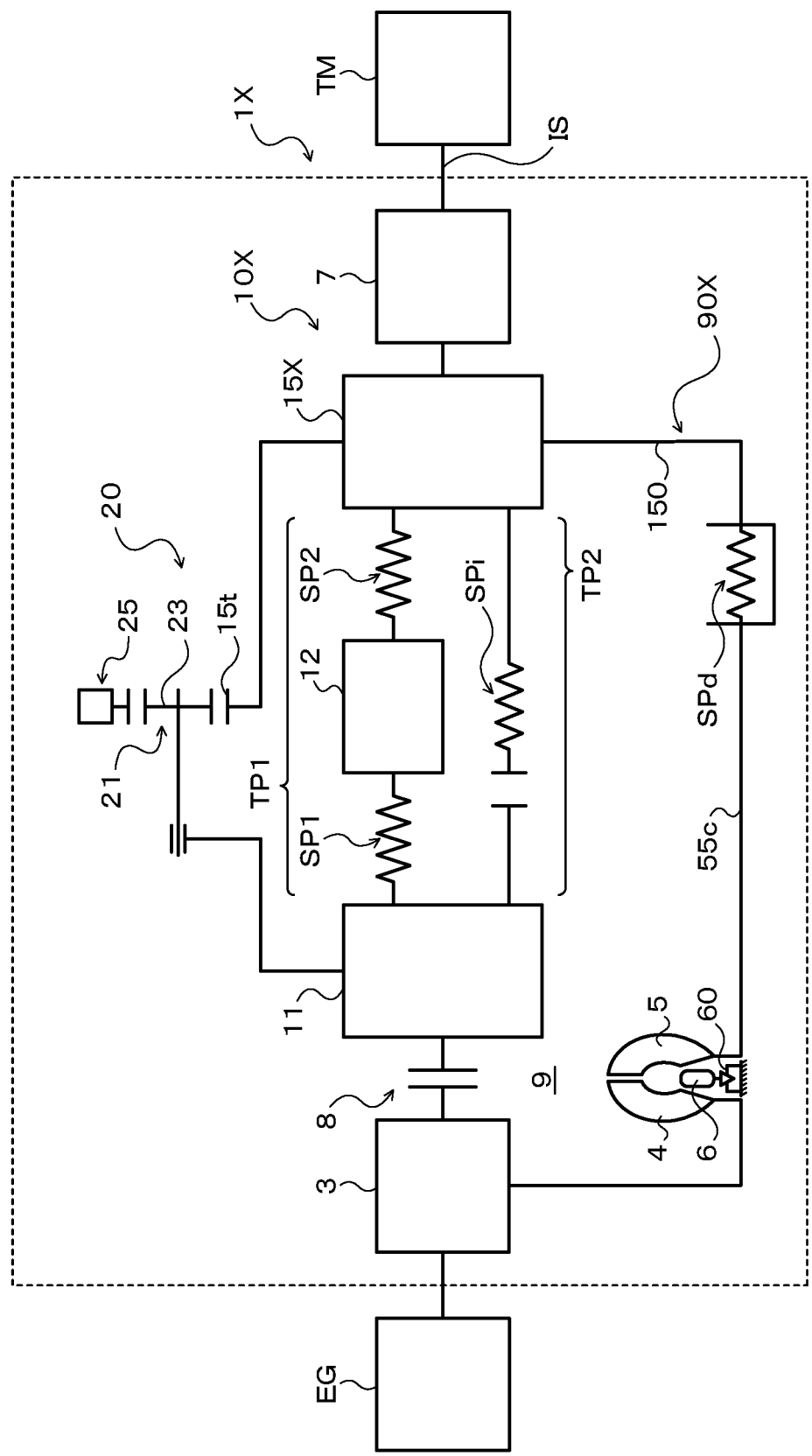
FIG. 6 is a schematic configuration diagram illustrating a starting device including another damper device of the present disclosure.

In the damper device 10, the sun gear of the planetary gear 21 may be coupled with (integrated with) the drive member 11, and the driven member 15 may be configured as the carrier of the driven member 15. The dynamic damper 90 may include an exclusive mass body that does not include the turbine runner 5. Moreover, in the damper device 10 described above, the inner springs SPi are also used as the elastic body of the dynamic damper 90. This configuration is, however, not essential. A dynamic damper 90X of a damper device 10X included in a starting device 1X shown in FIG. 6 includes a plurality of exclusive springs SPd, a coupling member 150 coupled with a driven member 15X and configured to hold the plurality of springs SPd, and a plurality of spring contact portions 55c provided in the turbine runner 5 as the mass body. In this modification, the springs SPd may be placed in the periphery of an outer circumferential portion of the turbine runner 5 such as to overlap with the ring gear 25 of the rotary inertia mass damper 20 when being viewed in the axial direction. This configuration enables the region in the periphery of the outer circumferential portion of the turbine runner 5 that is likely to be a dead space, to be effectively used as the space for placement of the springs SPd and thereby improves the overall space efficiency of the device.

The lockup rotation speed Nlup of the engine EG may not be necessarily set lower than the rotation speed $Nea_1$ of the engine EG corresponding to the frequency of the low rotation-side antiresonance point A1. More specifically, the lockup rotation speed Nlup may be set in a predetermined rotation speed range around the rotation speed $Nea_1$ corresponding to the frequency of the low rotation-side antiresonance point A1 (minimum frequency $fa_1$). The predetermined rotation speed range is, for example, a range of $Nea_1 - 1000$ rpm $\leq$ Nlup $\leq Nea_1 + 1000$ rpm or more specifically a range of $Nea_1 - 600$ rpm Nlup $Nea_1 + 600$ rpm. The lockup rotation speed Nlup may be equal to the rotation speed $Nea_1$ or may be set to a value close to the rotation speed $Nea_1$ (for example, $Nea_1 - 100$ rpm $\leq$ Nlup $\leq Nea_1 + 100$ rpm).

Figure 7:
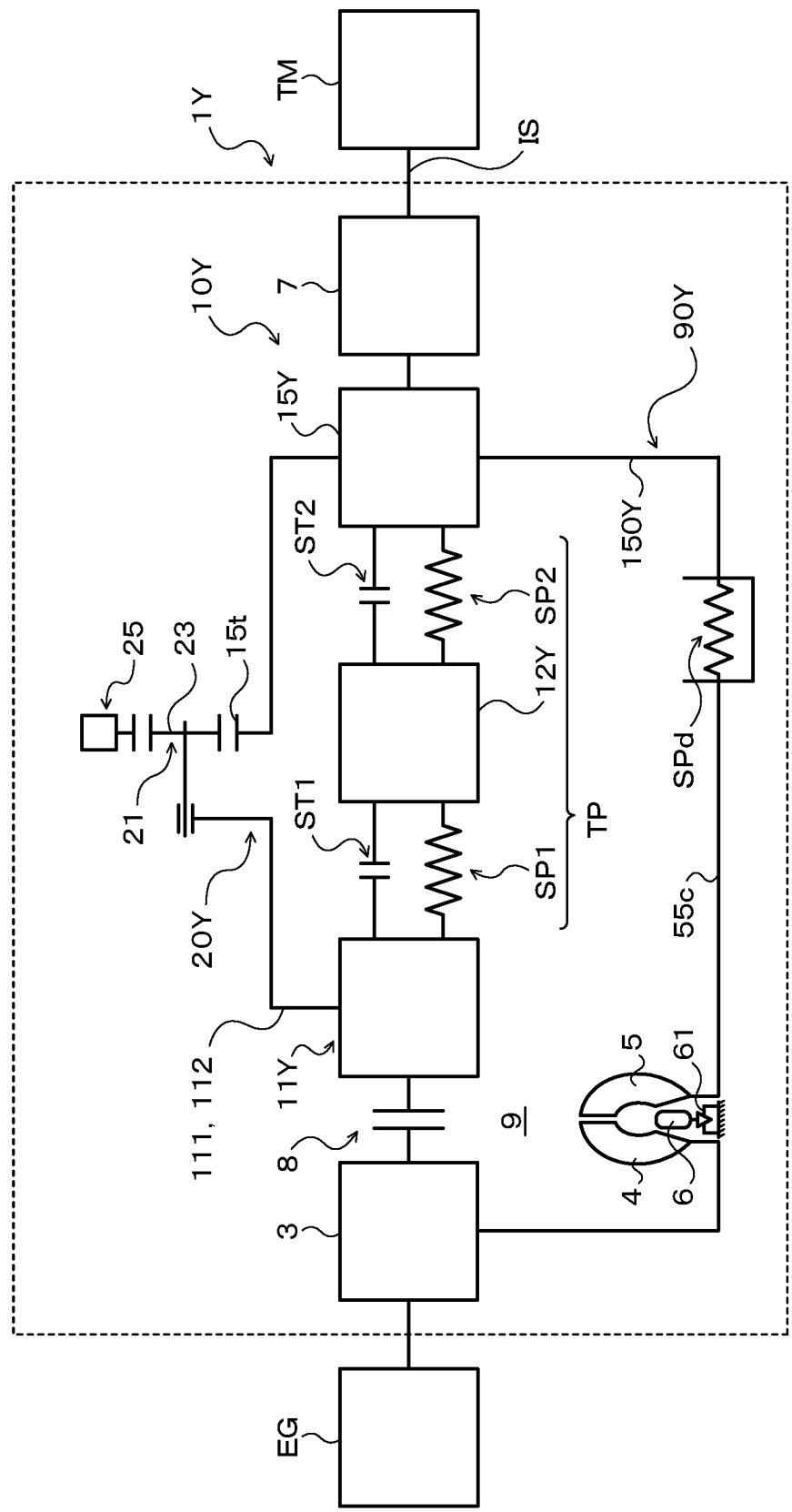
FIG. 7 is a schematic configuration diagram illustrating a starting device including another damper device of the present disclosure.

FIG. 7 is a schematic configuration diagram illustrating a starting device 1Y including a damper device 10Y according to a modification of the present disclosure. Like components to those of the starting device 1 and the damper device 10 or the like described above among components of the starting device 1Y and the damper device 10Y are expressed by like reference signs, and the duplicated description is omitted.

The damper device 10Y shown in FIG. 7 includes a drive member (input element) 11Y, an intermediate member (intermediate element) 12Y and a driven member (output element) 15Y, as rotational elements. The damper device 10Y also includes a plurality of first springs (first elastic body) SP1 arranged to transmit the torque between the drive member 11Y and the intermediate member 12Y; and a plurality of second springs (second elastic body) SP2 arranged to work respectively in series with the corresponding first springs SP1 and transmit the torque between the intermediate member 12Y and the driven member 15Y, as torque transmission elements (torque transmission elastic body). The plurality of first springs (first elastic body) SP1, the intermediate member 12Y and the plurality of second springs (second elastic body) SP2 constitute a torque transmission path TP between the drive member 11Y and the driven member 15Y. Additionally, a dynamic damper 90Y is coupled with the driven member 15Y. The dynamic damper 90Y includes a plurality of exclusive springs SPd; a coupling member 150Y coupled with the driven member 15Y and configured to hold the plurality of springs SPd; and a plurality of spring contact portions 55c provided in the turbine runner 5 as the mass body.

Like the rotary inertia mass damper 20 described above, a rotary inertia mass damper 20Y is configured by a single pinion-type planetary gear 21 and is provided in parallel to the torque transmission path TP between the drive member 11Y and the driven member 15Y. In the rotary inertia mass damper 20Y, the drive member 11Y (first and second input plate members 111 and 112) rotatably supports a plurality of pinion gears 23 and serves as a carrier of the planetary gear 21. The driven member 15Y has external teeth 15t and serves as a sun gear of the planetary gear 21.

The damper device 10Y also includes a first stopper ST1 configured to restrict relative rotation between the drive member 11Y and the intermediate member 12Y, i.e., to restrict deflection of the first springs SPi; and a second stopper ST2 configured to restrict relative rotation between the intermediate member 12Y and the driven member 15Y, i.e., to restrict deflection of the second springs SP2. One of the first and the second stoppers ST1 and ST2 restricts the relative rotation between the drive member 11Y and the intermediate member 12Y or the relative rotation between the intermediate member 12Y and the driven member 15Y when the input torque into the drive member 11Y reaches a predetermined torque T1 that is smaller than a torque T2 corresponding to a maximum torsion angle θmax of the damper device 10Y and a torsion angle of the drive member 11Y relative to the driven member 15Y becomes equal to or larger than a predetermined angle θref. The other of the first and the second stoppers ST1 and ST2 restricts the relative rotation between the intermediate member 12Y and the driven member 15Y or the relative rotation between the drive member 11Y and the intermediate member 12Y when the input torque into the drive member 11Y reaches the torque T2.

This configuration allows for deflections of the first and the second springs SP1 and SP2 until one of the first and the second stoppers ST1 and ST2 operates. When one of the first and the second stoppers ST1 and ST2 operates, deflection of one of the first and the second springs SP1 and SP2 is restricted. When both the first and the second stoppers ST1 and ST2 operate, deflections of both the first and the second springs SP1 and SP2 are restricted. Accordingly, the damper device 10Y has two-step (two-stage) damping characteristics. The first stopper ST1 or the second stopper ST2 may be configured to restrict the relative rotation between the drive member 11Y and the driven member 15Y.

The damper device 10Y having the configuration described above has similar functions and advantageous effects to those of the damper devices 10 and 10X described above. In the damper device 10Y, one of the first and second springs SP1 and SP2 may be arranged at intervals in the circumferential direction on an outer side of the other in the radial direction. For example, the plurality of first springs SP1 may be arranged at intervals in the circumferential direction in an outer circumferential-side region in the fluid chamber 9, and the plurality of second springs SP2 may be arranged at intervals in the circumferential direction on an inner side in the radial direction of the plurality of first springs SP1. In this configuration, the first springs SP1 and the second springs SP2 may be arranged to partly overlap with each other when being viewed in the radial direction. The springs SPd may be arranged in the periphery of an outer circumferential portion of the turbine runner 5 such as to overlap with the ring gear 25 of the rotary inertia mass damper 20Y when being viewed in the axial direction or may be arranged to be arrayed with the first springs SP1 or with the second springs SP2 in the circumferential direction. Furthermore, in the damper device 10Y, the sun gear of the planetary gear 21 may be coupled with (integrated with) the drive member 11Y, and the driven member 15Y may be configured as the carrier of the planetary gear 21.

Figure 8:
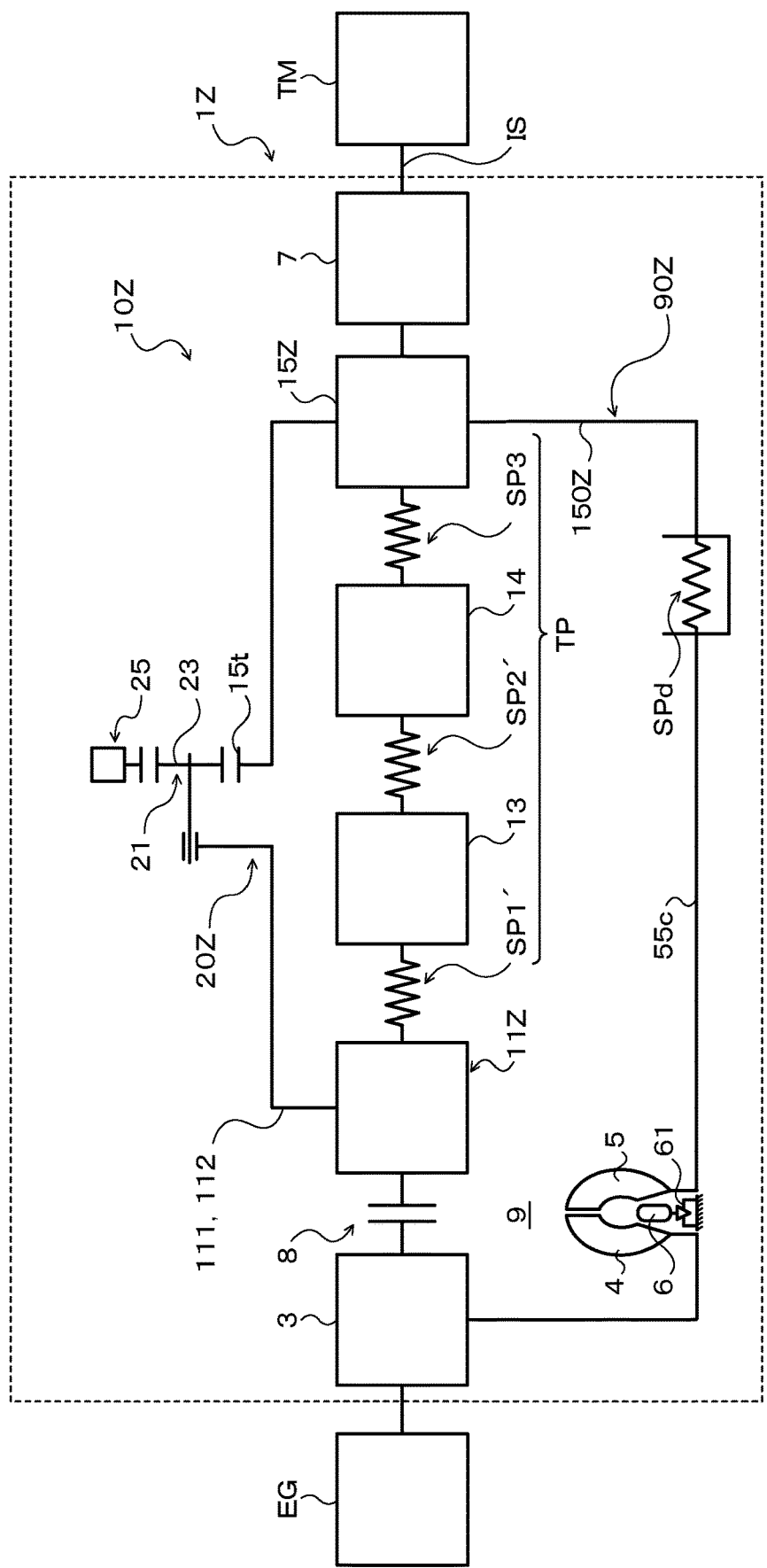
FIG. 8 is a schematic configuration diagram illustrating a starting device including another damper device of the present disclosure.

FIG. 8 is a schematic configuration diagram illustrating a starting device 1Z including a damper device 10Z according to another modification of the present disclosure. Like components to those of the starting device 1 and the damper device 10 or the like described above among components of the starting device 1Z and the damper device 10Z are expressed by like reference signs, and the duplicated description is omitted.

The damper device 10Z shown in FIG. 8 includes a drive member (input element) 11Z, a first intermediate member (first intermediate element) 13, a second intermediate member (second intermediate element) 14, and a driven member (output element) 15Z, as rotational elements. The damper device 10Z also includes a plurality of first springs (first elastic body) SP1' arranged to transmit the torque between the drive member 11Z and the first intermediate member 13; a plurality of second springs (second elastic body) SP2' arranged to transmit the torque between the first intermediate member 13 and the second intermediate member 14; and a plurality of third springs (third elastic body) SP3 arranged to transmit the torque between the second intermediate member 14 and the driven member 15Z, as torque transmission elements (torque transmission elastic body). The plurality of first springs (first elastic body) SP1', the first intermediate member 13, the plurality of second springs (second elastic body) SP2', the second intermediate member 14, and the plurality of third springs SP3 constitute a torque transmission path TP between the drive member 11Z and the driven member 15Z. Like the rotary inertia mass dampers 20 and 20Y described above, a rotary inertia mass damper 20Z is configured by a single pinion gear-type planetary gear 21 and is provided in parallel to the torque transmission path TP between the drive member 11Z and the driven member 15Z. A dynamic damper 90Z is further coupled with the driven member 15Z. The dynamic damper 90Y includes a plurality of exclusive springs SPd, a coupling member 150Z coupled with the driven member 15Z and configured to hold the plurality of springs SPd, and a plurality of spring contact portions 55c provided in the turbine runner 5 as the mass body.

In the damper device 10Z including the first and the second intermediate members 13 and 14, when the deflections of all the first to the third springs SP1', SP2' and SP3 are allowed, three resonances occur in the torque transmission path TP. More specifically, resonance of the entire damper device 10Z occurs in the torque transmission path TP due to vibrations of the drive member 11Z and the driven member 15Z in opposite phases when the deflections of the first to the third springs SP1', SP2' and SP3 are allowed. Resonance also occurs in the torque transmission path TP due to vibrations of the first and the second intermediate members 13 and 14 in opposite phases to the phases of the vibrations of both the drive member 11Z and the driven member 15Z when the deflections of the first to the third springs SP1', SP2' and SP3 are allowed. Resonance further occurs in the torque transmission path TP due to vibration of the first intermediate member 13 in an opposite phase to the phase of the vibration of the drive member 11Z, vibration of the second intermediate member 14 in an opposite phase to the phase of the vibration of the first intermediate member 13 and vibration of the driven member 15Z in an opposite phase to the phase of the vibration of the second intermediate member 14 when the deflections of the first to the third springs SP1', SP2' and SP3 are allowed. Accordingly, the damper device 10Z is capable of setting three antiresonance points where the vibration transmitted from the torque transmission path TP to the driven member 15Z and the vibration transmitted from the rotary inertia mass damper 20Z to the driven member 15Z are theoretically cancelled out each other.

Furthermore, in the damper device 10Z, the dynamic damper 90Z coupled with the driven member 15Z applies a vibration in an opposite phase to the phase of the vibration of the driven member 15Z, to the driven member 15Z. More specifically, when the inertia torque applied from the rotary inertia mass damper 20Z to the driven member 15Z decreases, the dynamic damper 90Z serves to complement the inertia torque. When the inertia torque applied from the rotary inertia mass damper 20Z to the driven member 15Z increases (to become excess) on the other hand, the dynamic damper 90Z serves to cancel at least part of the inertia torque (i.e., to complement the torque from the torque transmission path TP). As a result, this damper device 10Z further reduces the vibration level in a lower rotation speed range than a lowest rotation-side antiresonance point and in rotation speed ranges between adjacent antiresonance points and thereby further improves the vibration damping performance. The damper device 10Z may make a second antiresonance point on the higher rotation side (higher frequency side) than a first antiresonance point equal to (or closer to), for example, (the frequency of) a resonance point of the input shaft IS of the transmission TM and make a third antiresonance point on the higher rotation side (higher frequency side) than the second antiresonance point equal to (or closer to), for example, (the frequency of) a resonance point in the damper device 10Z, so as to effectively control the occurrence of these resonances.

The damper device 10Z may be configured such that three or more intermediate members are included in the torque transmission path TP. In the damper device 10Z, the sun gear of the planetary gear 21 may be coupled with (integrated with) the drive member 11Z, and the driven member 15Z may be configured as the carrier of the planetary gear 21. Furthermore, in the damper device 10Z, the sun gear of the planetary gear 21 may be coupled with (integrated with), for example, the first intermediate member 13, and, for example, the first intermediate member 13 may be configured as the carrier of the planetary gear 21.

Figure 9:
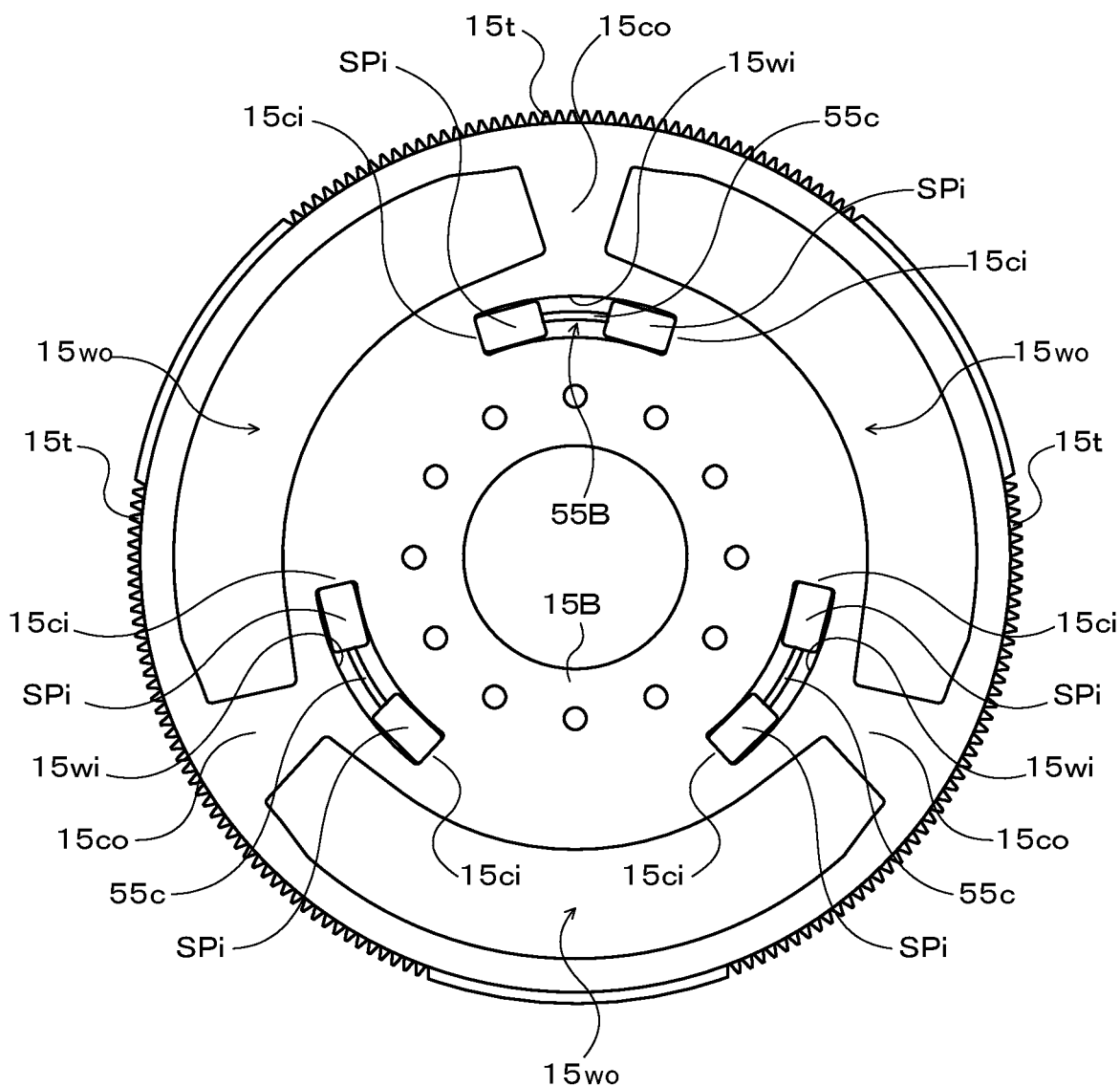
FIG. 9 is a front view illustrating another output element applicable to the damper device of the present disclosure.

FIG. 9 is a front view illustrating another driven member 15B applicable to the damper device 10. The driven member 15B shown in FIG. 9 excludes the ended slits 15s included in the driven member 15 described above and is configured such that the circumference of each inner spring placing window 15wi is longer than the total circumference of two inner springs SPi. As illustrated, two inner springs SPi are arranged at an interval in each inner spring placing window 15wi. A coupling member 55B used along with the driven member 15B includes the same number of spring contact portions 55c as the number of the inner spring placing windows 15wi. Each spring contact portion 55c is placed between the two inner springs SPi in the circumferential direction to contact with ends of the respective inner springs SPi. More specifically, in the mounted state, one end of each inner spring SPi contacts with a corresponding inner spring contact portion 15ci of the driven member 15B, and the other end contacts with the corresponding spring contact portion 55c of the coupling member 55B.

Employing this configuration also enables the dynamic damper 90 including the turbine runner 5 and the like as the mass body and the plurality of inner springs SPi as the elastic body to be coupled with the driven member 15B that is an output element of the damper device 10. Employing the driven member 15B also causes the inner spring contact portion 15ci and the spring contact portion 55c to intersect with each other (to be orthogonal to each other) and to overlap with the center of an end of the inner spring SPi, such that both the inner spring contact portion 15ci and the spring contact portion 55c press the periphery of the center of the end of the inner spring SPi. This configuration accordingly causes the inner spring SPi to be more appropriately stretched and contracted along the axial center and reduces a hysteresis or more specifically a frictional force applied to the inner spring SPi in the course of decreasing a load.

Figure 10:
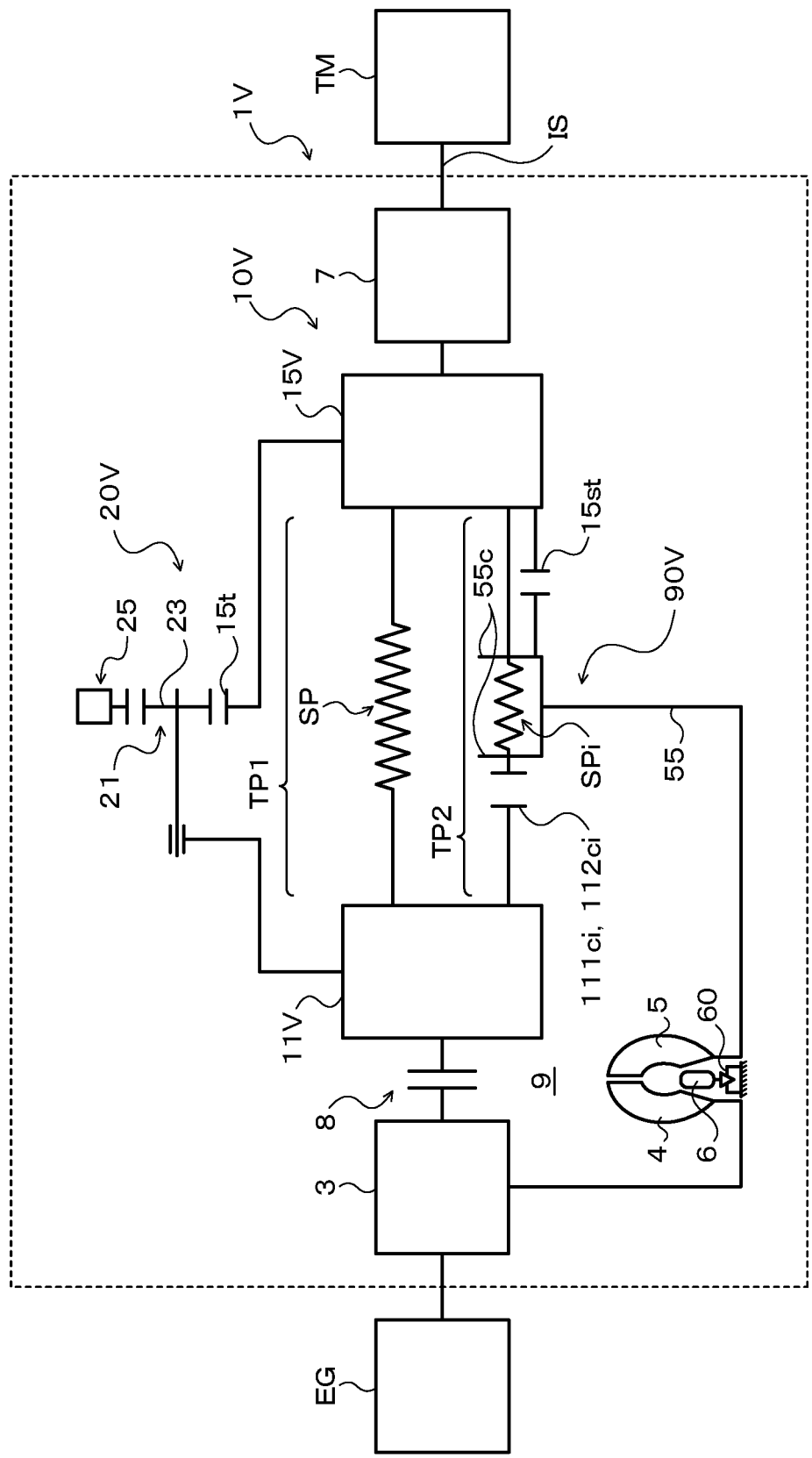
FIG. 10 is a schematic configuration diagram illustrating a starting device including another damper device of the present disclosure.

FIG. 10 is a schematic configuration diagram illustrating a starting device 1V including a damper device 10V according to another modification of the present disclosure. Like components to those of the starting device 1 and the damper device 10 or the like described above among components of the starting device 1V and the damper device 10V are expressed by like reference signs, and the duplicated description is omitted.

The damper device 10V shown in FIG. 10 has a configuration with omission of the intermediate member 12 from the damper device 10 described above and includes a drive member (input element) 11V and a driven member (output element) 15V as rotational elements and a plurality of springs SP arranged in parallel between the drive member 11V and the driven member 15V as a torque transmission elastic body. Like the rotary inertia mass damper 20 and the like described above, a rotary inertia mass damper 20V is configured by a single pinion-type planetary gear 21 and is provided in parallel to a first torque transmission path TP1 including the springs SP between the drive member 11V and the driven member 15V. Furthermore, a dynamic damper 90V is configured by a turbine runner 5 as a mass body (second mass body), a non-illustrated turbine hub, a coupling member 55, and a plurality of inner springs SPi arranged in parallel between these components and the driven member 15V as an elastic body. The plurality of inner springs SPi are used as the elastic body of the dynamic damper 90V when a torsion angle of the drive member 11V relative to the driven member 15V is smaller than a predetermined angle and inner spring contact portions 111ci and 112ci of the drive member 11V do not contact with ends of the respective inner springs SPi.

This damper device 10V is capable of setting one antiresonance point where the vibration transmitted from the drive member 11V to the driven member 15V via the first torque transmission path TP1 and the vibration transmitted from the drive member 11V to the driven member 15V via the rotary inertia mass damper 20V are theoretically cancelled out each other. In the damper device 10V, the dynamic damper 90V mainly applies a vibration in the same phase as the phase of the vibration applied from the first torque transmission path TP1 (springs SP) to the driven member 15V, to the driven member 15V when the rotation speed Ne of the engine EG, i.e., the rotation speed of the drive member 11V (frequency of the vibration transmitted to the drive member 11V) increases and the inertia torque applied from the rotary inertia mass damper 20V to the driven member 15V increases (to become excess). More specifically, in a higher rotation-side rotation speed range than the antiresonance point, the dynamic damper 90V serves to complement the torque from the first torque transmission path TP1 and cancels at least part of the inertia torque applied from the rotary inertia mass damper 20V to the driven member 15V. When the rotation speed Ne of the engine EG, i.e., the rotation speed of the drive member 11V (frequency of the vibration transmitted to the drive member 11V) is low (in a lower rotation-side rotation speed range than the antiresonance point), the dynamic damper 90V serves to complement the inertia torque applied from the rotary inertia mass damper 20V to the driven member 15V and cancels at least part of the vibration transmitted from the first torque transmission path TP1 to the driven member 15V. The damper device 10V accordingly has the further improved vibration damping performance.

Figure 11:
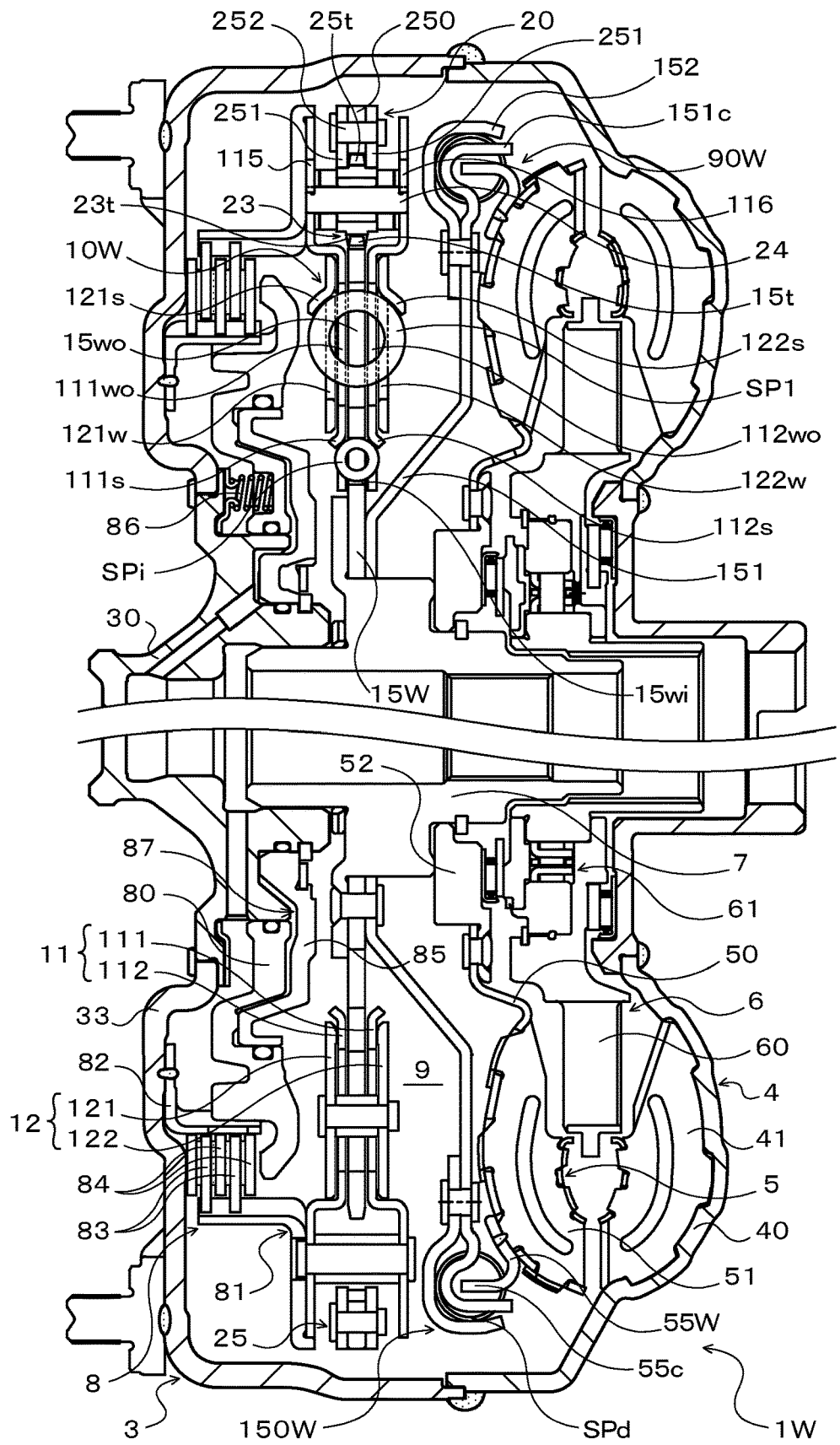
FIG. 11 is a sectional view illustrating a starting device including another damper device of the present disclosure.

FIG. 11 is a schematic configuration diagram illustrating a starting device 1W including a damper device 10W according to another modification of the present disclosure. Like components to those of the starting device 1 and the damper device 10 or the like described above among components of the starting device 1W and the damper device 10W are expressed by like reference signs, and the duplicated description is omitted.

In the damper device 10W included in the starting device 1W shown in FIG. 11, inner springs SPi are used only as a torque transmission elastic body of the damper device 10W. A dynamic damper 90W of the damper device 10W includes a plurality of (for example, three) exclusive springs SPd, a coupling member 150W coupled with a driven member 15W and configured to hold the plurality of springs SPd, and a coupling member 55W fixed to a turbine runner 5 as a mass body. The coupling member 150W includes a first plate member 151 that has an inner circumferential portion coupled with (fixed to) the driven member 15W by means of a plurality of rivets and a plurality of (for example, six) spring contact portions 151c extended outward in the radial direction from the inner circumferential portion, and a ring-shaped second plate member 152 coupled with (fixed to) the first plate member 151 by means of a plurality of rivets. The plurality of spring contact portions 151c of the first plate member 151 are arranged in pairs, and one spring SPd is placed between the paired two spring contact portions 151c. The second plate member 152 is formed to have a slightly larger outer diameter than the diameter of the turbine runner 5 and serves along with the plurality of spring contact portions 151c of the first plate member 151 to hold the plurality of springs SPd. The coupling member 55W includes a plurality of (for example, six) spring contact portions 55c extended in the axial direction to be arranged in pairs at intervals in the circumferential direction, and is fixed to (welded to) an outer circumferential portion of a turbine shell 50 of the turbine runner 5. One spring SPd is placed between the paired two spring contact portions 55c.

In the damper device 10W described above, the springs SPd of the dynamic damper 90W are arranged in the periphery of the outer circumferential portion of the turbine runner 5 or more specifically in an outer circumferential region in the fluid chamber 9 such as to overlap with the ring gear 25 of the rotary inertia mass damper 20 when being viewed in the axial direction. This configuration enables the region in the periphery of the outer circumferential portion of the turbine runner 5 that is likely to be a dead space, to be effectively used as the space for placement of the springs SPd and thereby improves the overall space efficiency of the device. This configuration also ensures the sufficient torsion angle of the springs SPd of the dynamic damper 90W and further improves the vibration damping performance of the dynamic damper 90W. This configuration also further increases the stiffness of the inner springs SPi and thereby further increases the maximum input torque of the damper device 10W.

As described above, a damper device (10, 10X, 10Y, 10Z, 10W) according to the present disclosure is configured to include an input element (11, 11Y, 11Z) to which a torque from an engine (EG) is transmitted; an intermediate element (12, 12Y, 13, 14); an output element (15, 15Y, 15Z, 15W); a first elastic body (SP1, SP1') arranged to transmit a torque between the input element and the intermediate element; and a second elastic body (SP2, SP2') arranged to transmit a torque between the intermediate element and the output element. The damper device (10, 10X, 10Y, 10Z, 10W) further includes a rotary inertia mass damper (20, 20Y, 20Z) that includes a first mass body (25) rotating in accordance with relative rotation between the input element (11, 11Y, 11Z) and the output element (15, 15Y, 15Z) and that is arranged between the input element (11, 11Y, 11Z) and the output element (15, 15Y, 15Z, 15W) to be parallel to a torque transmission path (TP1, TP) including the first elastic body (SP1), the intermediate element and the second elastic body (SP2); and a dynamic damper (90, 90X, 90Y, 90Z, 90W) including a second mass body (5, 52, 55, 55B, 55W) and an elastic body (SPi, SPd) arranged to couple the second mass body with the output element (15, 15Y, 15Z, 15W).

In the damper device of the present disclosure, on the assumption that an input torque transmitted to the input element periodically vibrates, the phase of the vibration transmitted from the input element to the output element via the torque transmission path shifts by 180 degrees from the phase of the vibration transmitted from the input element to the output element via the rotary inertia mass damper. In the torque transmission path including the intermediate element, in the state that deflections of the first elastic body and the second elastic body are allowed, a plurality of natural frequencies (resonance frequencies) are set, and resonance of the intermediate element is made to occur when the rotation speed of the input element reaches a rotation speed corresponding one of the plurality of natural frequencies. Accordingly, the damper device of the present disclosure is enabled to set two antiresonance points where the vibration transmitted from the torque transmission path to the output element and the vibration transmitted from the rotary inertia mass damper to the output element are theoretically cancelled out each other. Furthermore, the second mass body and the elastic body arranged to couple the second mass body and the output element constitute the dynamic damper. The dynamic damper applies vibration in an opposite phase to the phase of the vibration of the output element, to the output element. When the frequency of the vibration transmitted to the input element (rotation speed of the input element) is low and the inertia torque applied from the rotary inertia mass damper to the output element decreases, the dynamic damper serves to cancel at least part of the vibration transmitted from the torque transmission path to the output element (to complement the inertia torque). When the frequency of the vibration transmitted to the input element (rotation speed of the input element) is high and the inertia torque applied from the rotary inertia mass damper to the output element increases (to become excess), on the other hand, the dynamic damper serves to cancel at least part of the inertia torque (to complement the torque from the torque transmission path). As a result, the damper device of the present disclosure further reduces the vibration level in a lower rotation speed range than a low rotation-side antiresonance point and in a rotation speed range between two antiresonance points and thereby further improves the vibration damping performance in a range of relatively low rotation speed of the input element.

A minimum rotation speed (Nlup) in a rotation speed range where a torque is transmitted from the input element (11, 11Y, 11Z) to the output element (15, 15Y, 15Z, 15W) via the torque transmission path (TP1) may be lower than a rotation speed (Nea$_1$) corresponding to a minimum frequency (fa$_1$) among frequencies of antiresonance points (A1, A2) where a vibration amplitude of the output element (15, 15Y, 15Z, 15W) theoretically becomes equal to zero. The damper device of this aspect further reduces the vibration level in the lower rotation speed range than the low rotation-side antiresonance point. This accordingly further lowers the minimum rotation speed (lockup rotation speed)

in the rotation range where the torque is transmitted to the output element via the torque transmission path and improves the transmission efficiency of power. This results in further improving the fuel consumption of the engine.

A minimum rotation speed (Nlup) in a rotation speed range where a torque is transmitted from the input element (11, 11Y, 11Z) to the output element (15, 15Y, 15Z, 15W) via the torque transmission path (TP1) may be included in a predetermined rotation speed range around a rotation speed (Nea$_1$) corresponding to a minimum frequency (fa$_1$) among frequencies of antiresonance points (A1, A2) where a vibration amplitude of the output element (15, 15Y, 15Z, 15W) theoretically becomes equal to zero. In this aspect, the predetermined rotation speed range may be a range of not lower than Nea$_1$−600 rpm and not higher than Nea$_1$+600 rpm, where "Nea$_1$" denotes the rotation speed corresponding to the minimum frequency.

The damper device (10) of the above aspect may further comprise a third elastic body (SPi) arranged to work in parallel with the first elastic body and the second elastic body (SP1, SP2) when a torsion angle of the input element (11) relative to the output element (15) becomes equal to or greater than a predetermined angle (θref). The third elastic body (SPi) may couple the second mass body (12) with the output element (15) when the torsion angle of the input element (11) relative to the output element (15) is smaller than the predetermined angle (θref). This configuration eliminates the need to provide the dynamic damper with an exclusive elastic body and thus effectively suppresses size expansion of the damper device.

The torque transmission path (TP) may include a first intermediate element and a second intermediate element (13, 14) as the intermediate element and may further include a third elastic body (SP3). The first elastic body (SP1') may be arranged to transmit a torque between the input element (11Z) and the first intermediate element (13). The second elastic body (SP2') may be arranged to transmit a torque between the first intermediate element (13) and the second intermediate element (14). The third elastic body (SP3) may be arranged to transmit a torque between the second intermediate element (14) and the output element (15Z). The damper device of this aspect is capable of setting three antiresonance points where the vibration transmitted from the input element to the output element via the torque transmission path and the vibration transmitted from the input element to the output element via the rotary inertia mass damper are theoretically cancelled out each other and thereby further improves the vibration damping performance.

The second mass body may include a turbine runner (5) of a fluid transmission device. The second mass body may be, however, an exclusive mass body that does not include a turbine runner.

The output element (15, 15Y, 15Z, 15W) may be operatively (directly or indirectly) coupled with an input shaft (IS) of a transmission (TM).

Another damper device (10V) according to the present disclosure is configured to include an input element (11V) to which a torque from an engine (EG) is transmitted; an output element (15V); and a torque transmission elastic body (SP) arranged to transmit a torque between the input element (11V) and the output element (15V). The damper device (10V) further includes a rotary inertia mass damper (20V) that includes a first mass body (25) rotating in accordance with relative rotation between the input element (11V) and the output element (15V) and that is arranged between the input element (11V) and the output element (15V) to be parallel to a torque transmission path (TP1) including the torque transmission elastic body (SP); a second mass body (5, 55); and an elastic body (SPi) arranged to couple the second mass body (5, 55) with the output element (15V).

The damper device of this aspect is capable of setting one antiresonance point where the vibration transmitted from the torque transmission path to the output element and the vibration transmitted from the rotary inertia mass damper to the output element are theoretically cancelled out each other. The second mass body and the elastic body arranged to couple the second mass body with the output element constitute a dynamic damper. When the frequency of the vibration transmitted to the input element (rotation speed of the input element) is high and the inertia torque applied from the rotary inertia mass damper to the output element increases (to become excess), the dynamic damper mainly serves to cancel at least part of the inertia torque (to complement the torque from the torque transmission path). When the frequency of the vibration transmitted to the input element (rotation speed of the input element) is low and the inertia torque applied from the rotary inertia mass damper to the output element decreases, the dynamic damper may serve to cancel at least part of the vibration transmitted from the torque transmission path to the output element (to complement the inertia torque). This configuration further improves the vibration damping performance of the damper device.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The disclosure is applicable to, for example, the manufacturing industries of damper devices.

The invention claimed is:

1. A damper device comprising:
an input element to which a torque from an engine is transmitted, the input element including a first input plate and a second input plate;
an intermediate element;
an output element;
a first elastic body arranged to transmit a torque between the input element and the intermediate element;
a second elastic body arranged to transmit a torque between the intermediate element and the output element;
a rotary inertia mass damper between the first input plate and the second input plate, the rotatory inertia mass damper includes a first mass body rotating in accordance with relative rotation between the input element and the output element and that is arranged between the input element and the output element to be parallel to a torque transmission path including the first elastic body, the intermediate element and the second elastic body;
a second mass body, the input element and the second mass body being separate elements; and
a third elastic body arranged to couple the second mass body with the output element.

2. The damper device according to claim 1,
wherein a minimum rotation speed in a rotation speed range where a torque is transmitted from the input element to the output element via the torque transmission path is lower than a rotation speed corresponding to a minimum frequency among frequencies of antiresonance points where a vibration amplitude of the output element theoretically becomes equal to zero.

3. The damper device according to claim 1,
wherein a minimum rotation speed in a rotation speed range where a torque is transmitted from the input element to the output element via the torque transmission path is included in a predetermined rotation speed range around a rotation speed corresponding to a minimum frequency among frequencies of antiresonance points where a vibration amplitude of the output element theoretically becomes equal to zero.

4. The damper device according to claim 3,
wherein the predetermined rotation speed range is a range of not lower than $Nea_1-600$ rpm and not higher than $Nea_1+600$ rpm, where "$Nea_1$" denotes the rotation speed corresponding to the minimum frequency.

5. The damper device according to claim 1,
wherein the third elastic body is arranged to work in parallel with the first elastic body and the second elastic body when a torsion angle of the input element relative to the output element becomes equal to or greater than a predetermined angle,
wherein the third elastic body couples the second mass body with the output element when the torsion angle of the input element relative to the output element is smaller than the predetermined angle.

6. The damper device according to claim 1,
wherein the torque transmission path includes a first intermediate element and a second intermediate element as the intermediate element and wherein the first elastic body is arranged to transmit a torque between the input element and the first intermediate element, the second elastic body is arranged to transmit a torque between the first intermediate element and the second intermediate element, and the third elastic body is arranged to transmit a torque between the second intermediate element and the output element.

7. The damper device according to claim 1,
wherein the second mass body includes a turbine runner of a fluid transmission device.

8. The damper device according to claim 1,
wherein the output element is operatively coupled with an input shaft of a transmission.

9. A damper device comprising:
an input element to which a torque from an engine is transmitted, the input element including a first input plate and a second input plate;
an output element;
a torque transmission elastic body arranged to transmit a torque between the input element and the output element;
a rotary inertia mass damper between the first input plate and the second input plate, the rotatory inertia mass damper includes a first mass body rotating in accordance with relative rotation between the input element and the output element and that is arranged between the input element and the output element to be parallel to a torque transmission path including the torque transmission elastic body;
a second mass body, the input element and the second mass body being separate elements; and
an elastic body arranged to couple the second mass body with the output element.

10. The damper device according to claim 1,
wherein the first mass body is radially outside of the second mass body.

11. The damper device according to claim 1,
wherein the first elastic body is completely radially outside of the third elastic body.

* * * * *